United States Patent
Zuback

(10) Patent No.: US 8,999,172 B1
(45) Date of Patent: Apr. 7, 2015

(54) SELECTIVE REMOVAL OF DISSOLVED SUBSTANCES FROM AQUEOUS SOLUTIONS

(75) Inventor: Joseph E. Zuback, Camarillo, CA (US)

(73) Assignee: Global Water Advisors, Inc., Camarillo, CA (US)

(*) Notice: Subject to any disclaimer, the term of this patent is extended or adjusted under 35 U.S.C. 154(b) by 434 days.

(21) Appl. No.: 13/324,595

(22) Filed: Dec. 13, 2011

Related U.S. Application Data

(60) Provisional application No. 61/424,051, filed on Dec. 16, 2010.

(51) Int. Cl.
*C02F 1/42* (2006.01)
*C02F 1/44* (2006.01)

(52) U.S. Cl.
CPC .. *C02F 1/42* (2013.01); *C02F 1/441* (2013.01)

(58) Field of Classification Search
CPC ......... C02F 1/42; C02F 1/441; C02F 2103/08
USPC .......... 210/659, 663, 673, 677, 686, 665, 678
See application file for complete search history.

(56) References Cited

U.S. PATENT DOCUMENTS

| | | | |
|---|---|---|---|
| 3,078,140 A * | 2/1963 | Hatch | 423/100 |
| 4,478,722 A | 10/1984 | Boom | |
| 4,673,507 A | 6/1987 | Brown | |
| 5,922,171 A | 7/1999 | Paleologou et al. | |
| 6,482,305 B1 | 11/2002 | Mahi | |
| 7,514,003 B2 | 4/2009 | Grott | |
| 7,588,687 B2 | 9/2009 | Davankov et al. | |
| 7,717,173 B2 | 5/2010 | Grott | |
| 7,771,600 B2 | 8/2010 | Grott | |
| 2011/0042320 A1* | 2/2011 | Allen | 210/724 |

OTHER PUBLICATIONS

Brown, C.J., et al., "Chloride Removal From Kraft Liquors Using Ion Exchange Technology", Presented at the TAPPI Environmental Conference, Apr. 1998, Vancouver, B.C.
Zuback, J.E., et al., "Performance of Air Block Countercurrent Regeneration for Demineralization of High TDS Surface Water", Presented at the 44th Annual Meeting International Water Conference, Pittsburgh, PA, Oct. 24, 1983.
Brown et al., "New ion exchange processes for brine purification", Prosep Technologies Inc. technical paper. 2000.

(Continued)

*Primary Examiner* — Matthew O Savage
(74) *Attorney, Agent, or Firm* — Westman, Champlin & Koehler, P.A.; Z. Peter Sawicki; Amanda Prose

(57) ABSTRACT

A system is provided for removal of undesirable dissolved substances from solutions containing two or more dissolved substances to produce one or more new solutions suitable for beneficial use. The system utilizes amphoteric media in a treatment cycle where dissolved substances from the concentrated solution are first adsorbed by the media and subsequently rinsed with water to desorb and collect the dissolved substances sequentially into dilute effluent streams the substances are either aggregated or segregated based upon differences in relative concentrations of dissolved substances that is a result of differences in the affinity of the media for the dissolved substances. One or more of the dilute effluent streams are treated with a desalination process to recover water for media rinse and to concentrate the separated dissolved substances to facilitate beneficial use or disposal.

15 Claims, 15 Drawing Sheets

(56) References Cited

OTHER PUBLICATIONS

Brown et al., "A new ion exchange process for softening high TDS produced water", PC/Petroleum Society of CIM, Calgary, Alberta, Nov. 2002.

"Caustic Purification—Reducing chloride levels in caustic with DOWEX retardion 11A8 ion retardion resin", Dow Chemical Technical Bulletin, approximately at least 1974.

"Analytical Grade AG 11 A8 ion retardation resin", Technical Bulletin by Bio-Rad Laboratories, 2000 Alfred Nobel Dr., Hercules, CA 94547.

Snoeyink et al., "Removal of barium and strontium from groundwater", USEPA Environmental Rearch Brief, EPA/600/M-86/021, Feb. 1987.

\* cited by examiner

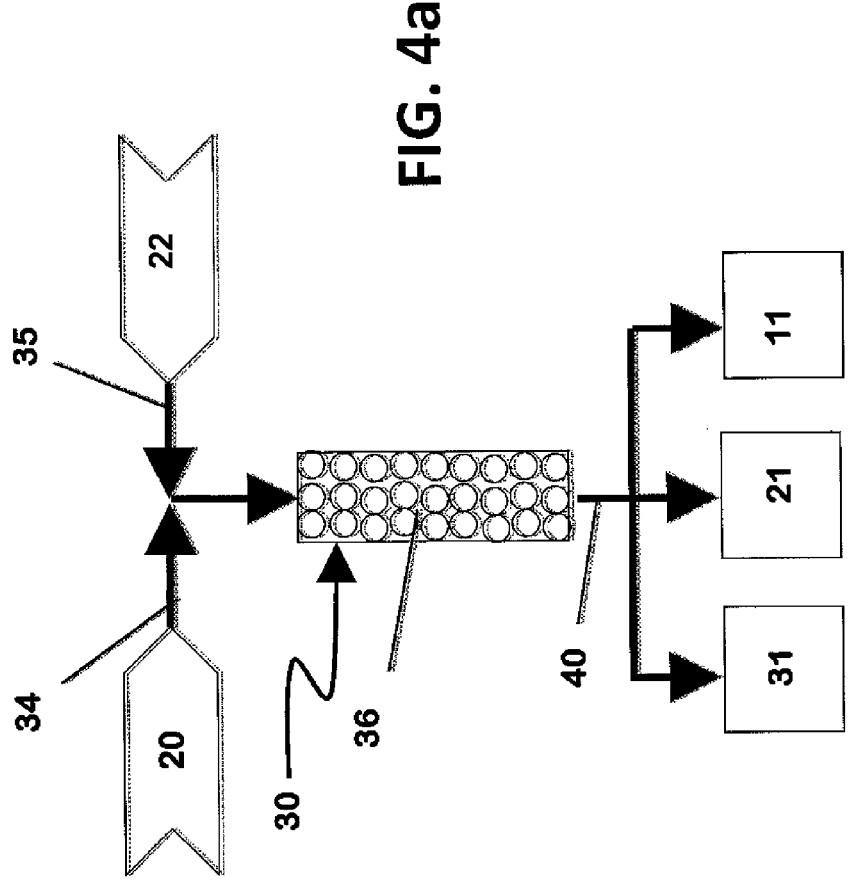

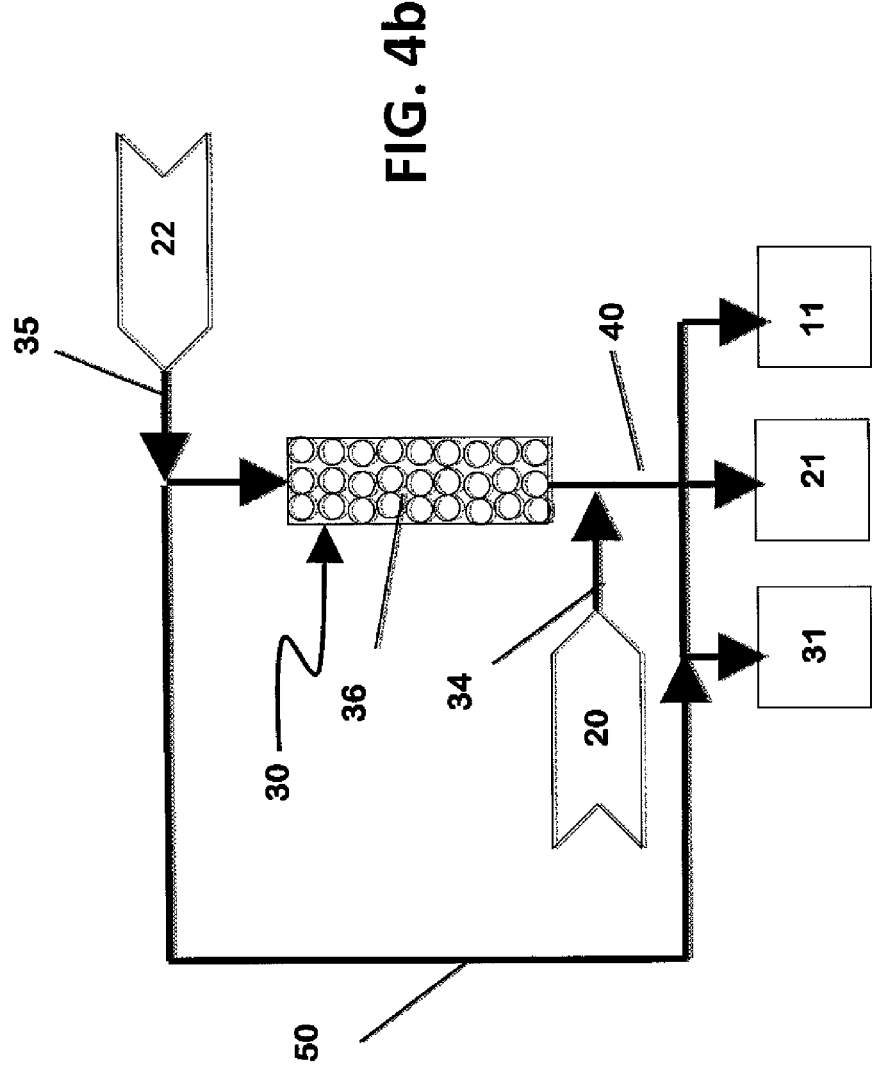

SELECTIVE REMOVAL OF DISSOLVED SUBSTANCES FROM AQUEOUS SOLUTIONS

CROSS-REFERENCE TO RELATED APPLICATION

The present application is based on and claims the benefit of U.S. provisional patent application Ser. No. 61/424,051, filed Dec. 16, 2010, the content of which is hereby incorporated by reference in its entirety.

FIELD

The present invention is in the technical field of water treatment. More particularly, the present invention is in the technical field of treatment processes for water solutions containing significant concentrations of two or more dissolved substances such as saline water and wastewater.

DESCRIPTION OF THE RELATED ART

Certain water and wastewater sources with high levels of dissolved salts and other dissolved substances can be used beneficially if undesirable dissolved substances, such as scale-forming constituents in saline wastewater, can be selectively removed. For example, in shale gas production areas like the Marcellus formation in the Appalachian Mountains, typically 4-6 million gallons of low salinity fresh water is used to hydraulically fracture underground shale formations in order to release natural gas. Typically about 1 million gallons of saline wastewater, referred to in the oil and gas production industry as flowback and produced water, flows from the formation after fracturing.

One method to dispose of this wastewater is to transport it to a remote deep disposal well for disposal by injection, another method is to use the wastewater for subsequent hydrofracturing operations by blending the saline wastewater with fresh water to create a water solution with intermediate salinity. In the latter method it is desirable to remove divalent cations such as calcium, magnesium, barium, and strontium from the wastewater prior to blending with fresh water to prevent subsequent precipitation and scale formation in the well that can negatively impact gas production. One conventional method of flowback treatment for removal of calcium present is via reaction with sodium carbonate (soda ash) to form calcium carbonate precipitate, of magnesium via reaction with sodium hydroxide (caustic soda) to form magnesium hydroxide precipitate, and of barium and strontium via reaction with a sulfate salt such as sodium sulfate to form barium and strontium sulfate precipitate. Essentially all precipitates are separated from the treated wastewater prior to blending the treated wastewater with fresh water for subsequent use as hydrofracturing fluid.

One drawback of the conventional approach is that the high cost for precipitation chemicals and safe sludge disposal is a significant component of the overall cost of wastewater management. Another drawback is that the precipitate creates a waste sludge that contains significant amount of dissolved salts in the interstitial water within the sludge than can leach out if the sludge is disposed of in landfills and potentially contaminate local fresh water supplies. Another drawback is that because of the significant quantities of precipitation chemicals required and sludge produced by this treatment process and the labor and maintenance necessary for solids handling equipment, flowback is commonly transported to regional centers for treatment and blending with fresh water which results in a high level of local truck traffic to transport wastewater from and treated water back to remote wells.

An alternative means of treating flowback water is via mobile evaporators that can treat flowback at or near the wellhead to produce high quality low salinity (distilled) water for hydrofracturing while generating a waste stream of concentrated salts. The major drawback of this approach is cost because of the expense of materials of construction generally required to prevent corrosion of metals from high temperature saline waste streams plus significant energy input required for evaporation. Another drawback of evaporation is production of a highly concentrated (typically 25% salt by weight) liquid waste byproduct, typically equal to 5-10% of the total volume of flowback water treated, that must be disposed of in an environmentally safe manner.

SUMMARY

From the foregoing discussion, it should be apparent that a need exists for a system and method to selectively remove dissolved substances from aqueous solutions when local circumstances make such separation with conventional precipitation and evaporation methods either uneconomical or otherwise environmentally or aesthetically undesirable. Beneficially, such a system and method would provide municipal and industrial water users and wastewater generators a more efficient and environmentally acceptable way to treat water and wastewater for beneficial use. Such a system and method would allow beneficial use of marginal quality water otherwise considered unusable and thus help reduce demand for scarce fresh water resources, especially as development of global natural gas reserves accessible only via hydrofracturing expands into regions with severe fresh water constraints. The system and method could be used as a mobile self-contained system to treat water and wastewater on an as-needed or as generated-basis or as a permanently sited system and method to continuously produce treated water for multiple beneficial users and circumstances.

In one embodiment, the invention is a system to purify an aqueous fluid stream. The system includes multiple vessels containing an amphoteric adsorption media operating in parallel in a cyclical fashion where at any time the media in a vessel may be either removing dissolved substances from the aqueous fluid stream via adsorption of the dissolved substances on the media (the loading step) or the adsorbed dissolved substances may be removed from the media by rinsing with water (the rinse step). The rinse water velocity, temperature, and direction of travel through the media may be the same as or different from the same conditions during the loading step as necessary to optimize overall performance. The water entering the vessel used for rinsing the media and the water exiting the vessel during the loading and rinse steps (the effluent) both contain lower concentrations of total dissolved substances than the aqueous fluid stream that is treated. Because the media has a stronger affinity for some dissolved substances compared to others in the waste fluid stream, the relative concentration of individual dissolved substances in the effluent will vary during the loading and rinse steps by a process called ion retardation. By segregating the effluent water in different containments (product cuts) based upon quality or suitability corresponding to the relative concentrations of individual dissolved substances, dissolved substances in the original aqueous fluid stream can be separated such that one or more of the segregated containments will contain a water solution that is suitable for beneficial use. The system further includes a desalination process or processes capable of treating one or more product cuts for the purposes of concentrating the dissolved substances in the product cut to facilitate beneficial reuse or minimize waste disposal volume and recovering water with low concentrations of dissolved substances that can be either reused as rinse water or other suitable purposes. Those skilled in the art will recognize that many desalination processes exist that use thermal, osmotic pressure, and/or electric field differences as the driving force for desalination and are possible for treating the product cut for the intended purposes.

In certain embodiments, dissolved substances in the aqueous fluid may first be concentrated with a desalination process to minimize the volume of fluid to be treated by the amphoteric media. The concentrate from the desalination process is treated separately by the amphoteric media or, in another embodiment, is blended with the aqueous fluid prior to treatment with the amphoteric media, and the effluent from the amphoteric media The effluent from the amphoteric media may be collected as separate product cuts in segregated containments with the product cut from one or more of the containments treated with a separate desalination system for the purposes of concentrating the dissolved substances in the product cut to facilitate beneficial reuse or minimize waste disposal volume and recovering water with low concentrations of dissolved substances that can be either reused as rinse water or other suitable purposes. In a further embodiment, especially applicable to but not limited to onsite wellhead treatment of water sources like shale gas flowback water where initial flows are highest and dissolved salt concentrations (salinity) are lowest followed by salinity gradually increasing as flow decreases, the desalination process may first be used to treat initially higher flows and concentrate low salinity flowback for subsequent treatment for separation of dissolved salts by the amphoteric media. The concentrated flowback would, under this embodiment, be treated with amphoteric media and a separate desalination process or, when the flowback reached a desired combination of reduced flow rate and increased salinity, as part of a blend with the reduced flow of flowback water. In the latter case the desalination system that had been used for direct treatment of low salinity flowback at the start of the flowback cycle would transition to use for the purposes of concentrating the dissolved substances in the amphoteric media product cut to facilitate beneficial reuse or minimize waste disposal volume and recovering water with low concentrations of dissolved substances that can be either reused as rinse water or other suitable purposes.

In a further embodiment where concentrations are adequately low for dissolved substances for which the amphoteric media has relatively high affinity compared to other dissolved substances present in the aqueous solution, the amphoteric media may primarily serve as a selective adsorption media to remove such dissolved substances from the aqueous solution to the practical storage capacity limit available for the media for such adsorbed dissolved substances (the adsorption step). When the storage capacity for such high affinity substances are reached, the adsorbed substances are removed by rinsing with water where the driving force is the much higher concentration of adsorbed substances on the media compared to the rinse water. The rinse water may be treated via desalination as an aggregated volume or segregated into various product cuts that reflect different affinities of the media for different dissolved substances. The rinse water velocity, temperature, and direction of travel through the media may be the same as or different from the same conditions during the adsorption step as necessary to optimize overall performance.

In a further embodiment a supplemental concentration process may be used, in addition to the desalination process or processes used for the purposes of concentrating the dissolved substances in the product cut and to facilitate recovery of water with low concentrations of dissolved substances, in order to further reduce the offsite disposal volume and/or increase overall water recovery. Those skilled in the art will recognize that many desalination systems use combinations of desalination processes that rely upon thermal, osmotic pressure, and/or electric field differences as the driving force for desalination. For example, reverse osmosis (RO) is commonly used to first desalinate, under low energy input conditions per unit volume treated, relatively low salinity water from power plant cooling tower blowdown followed by thermal evaporation of the RO concentrate and/or crystallization of the salts in the RO concentrate, with relatively high energy input per unit volume, in order to minimize offsite waste disposal volume and maximize. Waste heat from the supplemental concentration process or any other readily available waste heat source can be transferred to the aqueous feed and/or rinse water in order to increase the operating temperature and thus improve the kinetics and overall performance characteristics and efficiency of amphoteric media and various desalination processes.

To mitigate potential problems with fouling or pluggage from various contaminants present in the aqueous solution the method may include but not be limited to various pretreatment processes from the group of suspended solids removal technologies consisting of pre-settling basins, clarifiers, chemical flocculating clarifiers, and filters, from the group of oxidation technologies consisting of chemical addition, ozonation, ultraviolet light alone or in conjunction with chemicals, ultrasonic destruction, cavitation, plasma arc oxidation, high temperature oxidation, and from the group of adsorbent materials consisting of activated carbon, naturally occurring minerals, zeolites, and synthesized inorganic and organic adsorption media.

The method may further include receiving one or more signals from sensors and controlling one or more actuators. The sensors may measure parameters selected from the group consisting of salinity, electrical conductivity or resistivity, pressure, temperature, level, flow, density, and chemical composition. The actuators may be selected from the group consisting of electronic, hydraulic, and pneumatic manipulation of controlled physical components of the system. The controlled physical components of the system may be selected from the group consisting of valves, pumps, mixers, siphons, and blowers.

BRIEF DESCRIPTION OF THE DRAWINGS

FIG. 4a is a flow diagram of one component of the process to separate dissolve substances from aqueous solutions according to one embodiment of the invention where the flow of aqueous solution to be treated and the flow of rinse water are in the same direction.

FIG. 4b is a flow diagram of one component of the process to separate dissolve substances from aqueous solutions according to one embodiment of the invention where the flow of aqueous solution to be treated and the flow of rinse water are in opposite direction.

DETAILED DESCRIPTION OF ILLUSTRATIVE EMBODIMENTS

Figure 1:
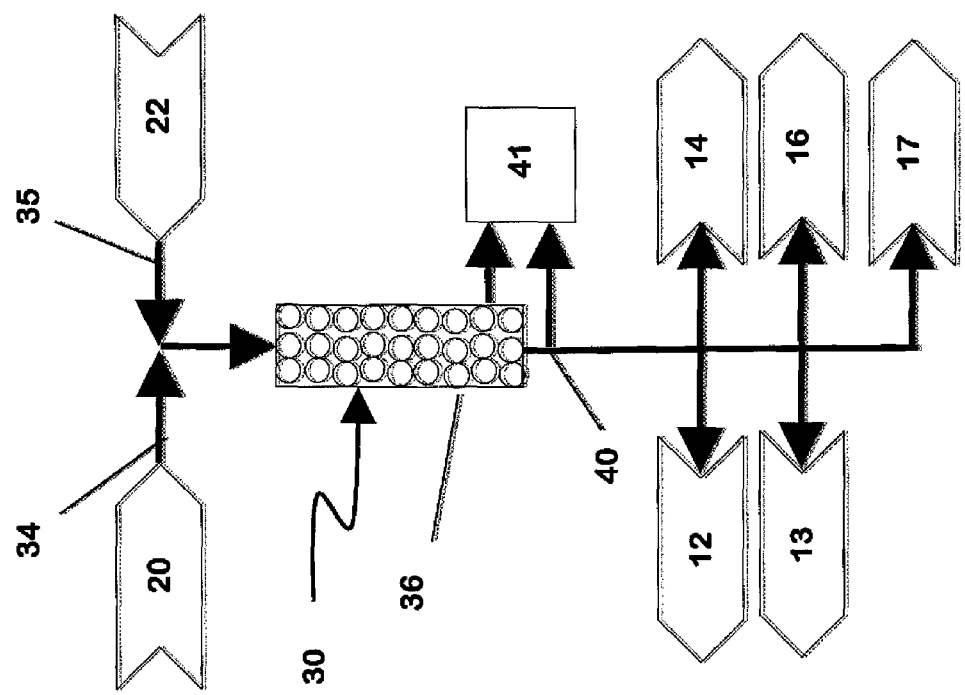
FIG. 1 is a graphical representation of the concentrations of two dissolved substances in the effluent of an amphoteric media adsorption column during one typical cycle of ion chromatographic separation process known as ion retardation.

The following detailed description represents the best currently contemplated modes for carrying out the invention. The description is not to be taken in a limiting sense, but is made merely for the purpose of illustrating the general principles of the invention.

The present invention resides in a method and system for treating aqueous solutions for the separation of undesirable dissolved substances from water solutions containing two or more dissolved substances to produce one or more new water solutions suitable for beneficial use.

Many treatment methods that separate dissolved substances from water, such as coagulation and settling, membrane separation, adsorption, ion exchange, electrodialysis, and evaporation are well known to those skilled in the art. The applicability and cost for each treatment method depend upon many factors such as the nature and relative concentrations of the dissolved substances, the flow rate to be treated, the options available for disposal of waste residuals, and local treatment site circumstances.

Of particular interest are solutions that are a mixture of salts and organics and other solutions, typically exceeding the salinity of seawater (with dissolved salt concentrations of approximately 33,000 milligrams per liter) containing a mixture of salts associated with monovalent cations such as sodium and potassium and divalent cations such as calcium, magnesium, barium, and strontium. In certain applications such as hydrofracturing of underground shale formations for recovery of natural gas, saline and hypersaline aqueous solutions can be used for hydrofracturing fluid of the concentrations of divalent cations are sufficiently low to prevent scale formation within the gas collection piping and appurtenances and to prevent interference with chemicals used in the hydrofracturing process that are sensitive to the presence of divalent cations.

Shale gas hydrofracturing typically requires millions of gallons of water for each well that is developed or re-fractured and generates a significant volume of saline or hypersaline wastewater. The initial and largest fraction of the wastewater that flows back from the well, typically during the first 3-4 weeks following well completion, is referred to as flowback; wastewater flowing from the water beyond that point is referred to as produced water which can continue to flow at low rates for months and years after completion. Typically the salinity of the wastewater gradually increases and the flow rate decrease over time.

Flowback and produced water contains a mixture of monovalent cation and divalent cation salts, and divalent cation salts typically range from 25-35% of the total salts presentation. The average concentration of dissolved salts in flowback can vary significantly depending upon the shale formation where the gas well is developed. The highest average concentrations found in the US are in the Marcellus zone beneath the Appalachian Mountains. In a typical Marcellus flowback scenario, the total flowback waste volume can be approximately 30,000 barrels (1.26 million gallons) containing more than 100 tons of dissolved salts.

Reusing flowback for hydrofracturing is very desirable because it reduces the cost for offsite waste disposal and reduces the demands placed upon local fresh water resources to meet hydrofracturing needs by replacing a portion of fresh water with flowback. In many circumstances the flowback salt characteristics necessitate removal of salts from flowback so that the blend with fresh water does not cause scale or problems with hydrofracturing chemicals. Two methods for treatment of flowback under such circumstances are chemical precipitation for removal of divalent cations and evaporation.

Chemical precipitation methods for removing divalent cations from saline wastewater containing a mixture of both divalent and monovalent cations have used sodium carbonate (soda ash) to remove primarily calcium and barium as their respective carbonate precipitates, sodium hydroxide (caustic soda) to remove magnesium as magnesium hydroxide, and a sulfate salt like sodium sulfate to precipitate barium and strontium as their respective sulfate precipitates. Precipitates formed are typically removed by coagulation to facilitate separation by settling and/or filtration. Such treatment requires a complex system of chemical feeders, mixing tanks, settling and filtration devices, and sludge dewatering devices fed with relatively large amounts of precipitation chemicals while generating relatively large amounts of dewatered sludge cake produced from the precipitate. The most typical approach for applying this method for flowback treatment is to first transport flowback from one or more well development locations to a centralized facility, treat the flowback and blend with fresh water, then return the blend back to the well development locations for reuse in hydrofracturing. The major drawbacks of this method are transportation costs of fluids from and to the well development area and the high costs of chemicals and safe sludge disposal.

The method of the present invention integrates two components into a single process for separating dissolved substances (solutes) from water. The first component utilizes amphoteric media in a separation step called ion retardation or acid retardation to adsorb dissolved substances from aqueous solutions such that one or more solutes with high affinity for the media that adsorb preferentially can be subsequently separated from other solutes with low affinity for the media that are not adsorbed such as non-ionized organics or are readily displaced by solutes with a high affinity for the media. Following separation via adsorption, solutes with a high affinity for the media can be removed from the media with copious quantities of water containing relatively low concentrations of the solutes (rinse). Amphoteric media is adsorption media or resin with both cationic and anionic functional groups that can adsorb ionic solutes at higher concentrations from aqueous solutions and desorb solutes with low salinity rinse water. Ion and acid retardation with amphoteric resins can be applied to aqueous solutions containing both ionized and non-ionized solutes, such as sodium chloride and ethylene glycol or other non-ionized organics, or a mixture of ionized solutes or salts, such as s calcium chloride and sodium chloride where there exist significant differences in the individual salt's affinity for the media, or a mixture of dissolved acids and salts such as sulfuric acid and ferrous sulfate.

Ion or acid retardation can be applied when one solute species has greater selectivity or affinity for the amphoteric media. The affinity which a solute has for a media varies by type of solute, concentration, flow velocity through the media, and temperature. Ion or acid retardation is most effective where there are significant differences in affinity for the media for the solutes in the aqueous solution for which separation is desired. When a fixed volume of aqueous solution comprised of mixed solutes with affinity for the media flows through a column of amphoteric media, initially all of the solutes present will be adsorbed by the media up to the limit of the solute adsorption capacity of the media that is possible based upon the type of solute, concentration, flow velocity through the media, and temperature. If the feed of aqueous solution is continued beyond the limit of the solute adsorption capacity of the media, solutes in the feed with higher affinity for the media will displace solutes with lower affinity for the media that had previously been adsorbed in the media. If water with solutes at a lower concentration (rinse) subsequently flows through amphoteric media that is in the condition where the media's solute adsorption capacity is partially or completely utilized, the solute concentration difference that exists between the media and water favors release of solutes from the media (desorption) into the water. During the initial flow of rinse water, solutes with high affinity for the media that are released into the initial rinse water from media nearest the water entrance will tend to displace adsorbed solutes with low affinity for the media as the rinse water flows through the media column. After the solutes with low affinity for the media are displaced with desorbed and re-adsorbed solutes with high affinity for the media, then concentration driving force between the high concentration of solutes in the media and the low concentration of solute in the rinse water favor desorption of all solutes from the media.

The ratio of the concentration of a solute with high affinity for the media to the concentration of a solute with low affinity for the media (relative concentration) in the column effluent compared to the aqueous solution feed is a useful indicator of the degree of solute separation that results from this process. In the initial effluent during rinsing, typically the individual concentrations of each solute are much lower but the relative concentration is significantly lower than found in the aqueous solution feed. The relative concentration tends to be low at the beginning of the rinse step as the bulk of the adsorbed solutes with low affinity are first preferentially desorbed. During the balance of the rinse step the individual solute concentrations tend to decline slowly but the relative concentration tends to increase as the remaining adsorbed solutes slowly diffuse into the rinse water and are removed from the column.

The process of feeding a column of amphoteric media with an aqueous solution containing solutes to be separated followed by water rinse occurs in practice in a regular cycle. After the media has undergone several feed-rinse cycles it reaches equilibrium with solutes entering via the aqueous solution feed that are adsorbed by the media, solutes exiting the media via desorption with rinse water, and solutes remaining on the media at the end of the rinsing step. After equilibrium is reached, the relative concentration of solutes in the media effluent at various points in time in the feed-rinse cycle is very predictable such that various portions, fractions, or "cuts" of the media effluent can be diverted for different purposes based upon differences in relative concentrations of solutes of each fraction.

FIG. 1 conceptually illustrates a typical column or vessel 30 containing amphoteric media 36 through which an aqueous solution 20 containing solutes is introduced as feed 34 to the typical column or vessel 30 containing amphoteric media 36 to allow the solutes to be adsorbed by the media. The aqueous solution is followed by rinse water 22 introduced 35 to selectively remove the adsorbed solutes from the media. The aqueous solution 20 and water that exits the column (effluent) 40 can subsequently be separated into one or more effluent fractions 12 13 14 16 17 based upon measurable differences in the relative concentrations of the solutes introduced via the aqueous solution 20.

Figure 2:
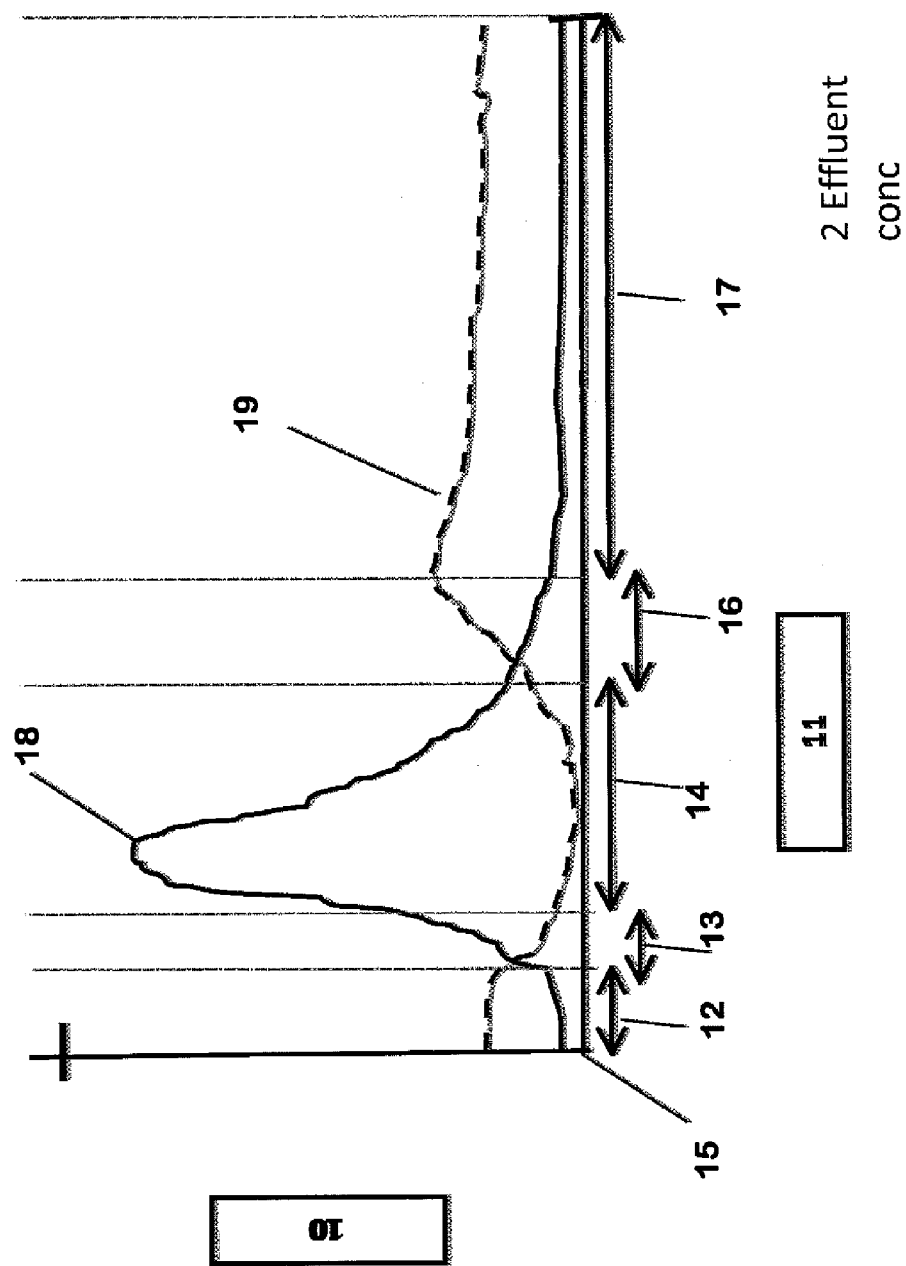
FIG. 2 is a flow diagram of a process to separate dissolve substances from aqueous solutions according to one embodiment of the invention.

FIG. 2 illustrates the typical concentration of two different solutes, originally present in equal concentrations in the aqueous solution 20, that is anticipated for the effluent 40 from media column 30 during a typical treatment and rinsing cycle. The graph shows the relationship between concentration 10 of the individual solutes, typically expressed as milligrams per liter, and the cumulative volume 11 of effluent that has passed through the column starting at the point in time when the aqueous solution feed was first introduced into the column inlet at the beginning 15 of the cycle and ending when all of the rinse water 22 has been introduced into the column inlet. FIG. 2 plots the concentration of one solute with lesser affinity for the media 18 and the concentration of another solute with greater affinity for the media 19 present at particular times in the effluent 40 exiting the media column. The first portion of effluent 12 initially exiting the column is water that remained in the interstitial space within the media from the previous cycle that has been displaced by the aqueous solution feed. The second portion of effluent 13 exiting the column contains a relatively low concentration of both solutes and the gradual rise in the relative concentration of the solute 18 with lesser affinity for the media reflects the preferential adsorption by the media of solute with greater affinity for the media 19. The relative concentrations of the two solutes in the second portion of effluent 12 may be deemed either acceptable for one intended purpose 38 or another 39 or be saved to be blended with the feed 37 and recycled for treatment in a subsequent cycle. The third portion of effluent 14 exiting the column contains a relatively high concentration of the solute 18 with lesser affinity for the media and relatively low concentration of solute with greater affinity for the media 19 containing relative concentrations of solutes suitable for an intended purpose 38.

The fourth portion of effluent 16 exiting the column contains a relatively low concentration of both solutes. The lower concentration of the solute 18 with lesser affinity for the media in the fourth portion of effluent 16 compared to the third portion of effluent 14 reflects the prior displacement from the media of the preponderance of the solute 18 with lesser affinity for the media that was introduced with the aqueous solution 20. The higher concentration of the solute 19 with greater affinity for the media in the fourth portion of effluent 16 compared to the third portion of effluent 14 reflects the prior displacement from the media of the solute 18 with lesser affinity for the media which reverses the solute adsorption equilibrium within the media such that the adsorbed solute 19 with greater affinity for the media gradually desorbs from the media and enters the rinse water to exit the media as effluent 14 along with any residual solute 18 with lesser affinity for the media remaining on the media. The relative concentrations of the two solutes in the fourth portion of effluent 14 may be deemed either acceptable for one intended purpose 38 or another 39 or be saved to be blended with the feed 37 and recycled for treatment in a subsequent cycle.

The fifth and last portion of effluent 17 exiting the column contains a relatively low concentration of both solutes but contains a much higher relative concentration of the solute 19 with greater affinity for the media. All solute concentrations gradually decrease with increasing volumes of rinse water that passes though the media column 30. The relative concentrations of the two solutes in the fifth portion of effluent 17 may be deemed either acceptable for an intended purpose 39 or be saved to be blended with the feed 37 and recycled for treatment in a subsequent cycle.

Various analytical methods exist such as those that measure salinity, electrical conductivity or resistance, specific gravity, or concentrations of specific solutes or class of solutes based upon chemical titration or other individual ion measurement methods that can be used to measure the individual, total, and relative concentrations of solutes in the water either within the media 36 or the effluent 40 and use such measurements within an integrated process control system 41 that determines when the effluent 40 at any point of time should be diverted to any intended purpose or be saved to be blended with the feed 37 and recycled for treatment in a subsequent cycle.

A laboratory scale column test was devised to test the separation efficacy of the method disclosed for two solutes with different levels of affinity for amphoteric media under saline and hypersaline feed conditions. The amphoteric media chosen was Dowex Retardion 11A8, manufactured as a styrene-divinylbenzene polymer bead that contains both quaternary ammonium strong base anion functional groups and carboxylic acid weak acid cation functional groups that provides amphoteric properties necessary to adsorb solutes at high aqueous solution concentrations and desorb solutes at low concentrations with water. A glass column was filled with 88 milliliters of resin to a depth of 32.5 cm and rinsed with 400 milliliters of distilled water prior to testing.

Feed solutions were prepared with measured weights of laboratory grade salts and distilled water to produce aqueous solutions with varying concentrations of dissolved salts. A handheld salinity meter capable of reading up to 9,999 mg/L salinity was used to measure salinity. Samples with salinity greater than 9,999 mg/L were proportionately diluted with distilled water to reduce the salinity to less than 9,999 mg/L and actual salinity was calculated by multiplying the measurement by the dilution factor. Calcium concentrations were determined via titration with Seifert test kits that are designed for calcium determination in saline environments and calcium chloride concentrations were calculated based upon the measured calcium concentration. Sodium concentrations in each sample were estimated by first subtracting the salinity attributable solely to the calcium chloride concentration from the sample salinity measurement and then estimating the equivalent sodium concentration that correlated with the salinity difference. The sodium chloride concentration was deemed to be zero when the salinity attributable solely to the measured calcium concentration equaled or exceeded the measured salinity.

Testing was conducted with aqueous solutions with three different concentrations of total dissolved salts consisting of a mixture of calcium chloride and sodium chloride in solution. A feed of 50 ml was introduced to the test column to generate the results shown in Tables 1 and 2 and a feed of 25 ml was introduced to the test column to generate the results shown in Tables 3. 300 ml of distilled water was used to rinse the column in all cases. The data shown in Table 1 was taken during the eighth cycle of treatment with the feed chemistry shown in Table 1 and the data shown in Tables 2 and 3 was taken during the third cycle of treatment with the feed chemistry shown in Tables 2 and 3 respectively. A total of approximately 300 ml of effluent was collected for each test starting with the introduction of the feed to the test column and ending when the final rinse water was fed to the test column. The flow rate for all water flowing through the column through all tests was a constant 3 milliliters per minute and temperature was in the range of 23-25 degrees Celsius. Effluent from the column was collected in the volumes indicated and each effluent sample was individually analyzed for salinity and calcium concentration.

TABLE 1

LABORATORY COLUMN ANALYTICAL RESULTS
FEED = 50 ML FEED SALINITY = 40,500 MG/L

| | Volume ml | Calcium via titration mg/L | Salinity per meter reading mg/L | Calcium chloride mg/L | Sodium chloride by diff. mg/L | Total Dissolved Salts mg/L | CaCl2 as % TDS | Relative Conc. CaCl2 to NaCl |
|---|---|---|---|---|---|---|---|---|
| Feed | 50 | | 90240 | 12500 | 28000 | 40500 | 31% | 0.45 |
| Rinse | 300 | | 150 | | | 150 | | |
| Effluent Sample | | | | | | | | |
| 1 | 21.5 | 540 | 1620 | 1499 | 122 | 1620 | 93% | 12.33 |
| 2 | 25 | 250 | 4700 | 694 | 4006 | 4700 | 15% | 0.17 |
| 3 | 28 | 90 | 17000 | 250 | 16750 | 17000 | 1% | 0.01 |
| 4 | 26 | 250 | 16700 | 694 | 16006 | 16700 | 4% | 0.04 |
| 5 | 21 | 580 | 13200 | 1554 | 11646 | 13200 | 12% | 0.13 |
| 6 | 22 | 1020 | 7600 | 2831 | 4770 | 7600 | 37% | 0.59 |
| 7 | 24 | 1020 | 5280 | 2831 | 2450 | 5280 | 54% | 1.16 |
| 8 | 21 | 1080 | 3790 | 2997 | 793 | 3790 | 79% | 3.78 |
| 9 | 26.5 | 1050 | 3030 | 2914 | 116 | 3030 | 96% | 25.06 |
| 10 | 26 | 1008 | 2440 | 2797 | — | 2797 | 100% | — |
| 11 | 29 | 840 | 2020 | 2331 | — | 2331 | 100% | — |
| 12 | 24 | 672 | 1640 | 1865 | — | 1865 | 100% | — |
| 13 | 24 | 660 | 1680 | 1832 | — | 1832 | 100% | — |
| 14 | 6 | 600 | 1580 | 1665 | — | 1665 | 100% | — |

TABLE 2

LABORATORY COLUMN ANALYTICAL RESULTS
FEED = 50 ML FEED SALINITY = 81,000 MG/L

| | Volume ml | Calcium via titration mg/L | Salinity per meter reading mg/L | Calcium chloride mg/L | Sodium chloride by diff. mg/L | Total Dissolved Salts mg/L | CaCl2 as % TDS | Relative Conc. CaCl2 to NaCl |
|---|---|---|---|---|---|---|---|---|
| Feed | 50 | | 90240 | 12500 | 56000 | 81000 | 31% | 0.45 |
| Rinse | 300 | | 150 | | | 150 | | |
| Effluent Sample | | | | | | | | |
| 1 | 23 | 800 | 2350 | 2220 | 130 | 2350 | 94% | 17.08 |
| 2 | 24 | 120 | 2940 | 333 | 2607 | 2940 | 11% | 0.13 |
| 3 | 27 | 50 | 20500 | 139 | 20361 | 20500 | 1% | 0.01 |
| 4 | 24 | 500 | 49300 | 1388 | 47913 | 49300 | 3% | 0.03 |
| 5 | 27 | 800 | 29600 | 2220 | 27380 | 29600 | 8% | 0.08 |
| 6 | 28 | 2100 | 14400 | 5828 | 8573 | 14400 | 40% | 0.68 |
| 7 | 23 | 2400 | 8000 | 6560 | 1340 | 8000 | 83% | 4.97 |
| 8 | 26.5 | 2000 | 5630 | 5550 | 80 | 5630 | 99% | 69.38 |
| 9 | 27 | 1705 | 4370 | 4731 | — | 4731 | 100% | — |
| 10 | 25 | 1500 | 3530 | 4163 | — | 4163 | 100% | — |
| 11 | 29 | 1300 | 3200 | 3608 | — | 3608 | 100% | — |
| 12 | 26 | 1500 | 2830 | 4163 | — | 4163 | 100% | — |
| 13 | 25 | 1300 | 2550 | 3608 | — | 3608 | 100% | — |
| 14 | 16.5 | 800 | 2400 | 2220 | — | 2220 | 100% | — |

TABLE 3

LABORATORY COLUMN ANALYTICAL RESULTS
FEED = 25 ML FEED SALINITY = 81,000 MG/L

| | Volume ml | Calcium via titration mg/L | Salinity per meter reading mg/L | Calcium chloride mg/L | Sodium chloride by diff. mg/L | Total Dissolved Salts mg/L | CaCl2 as % TDS | Relative Conc. CaCl2 to NaCl |
|---|---|---|---|---|---|---|---|---|
| Feed | 25 | | 135360 | 37500 | 84000 | 121500 | 31% | 0.45 |
| Rinse | 300 | | 150 | | | 150 | | |
| Effluent Sample | | | | | | | | |
| 1 | 30 | 587 | 1620 | 1629 | — | 1629 | 100% | — |
| 2 | 14 | 843 | 4700 | 2339 | 1 | 2340 | 100% | — |
| 3 | 15.5 | 500 | 17000 | 1388 | 18513 | 19900 | 7% | 0.07 |
| 4 | 22.5 | 80 | 16700 | 222 | 40978 | 41200 | 1% | 0.01 |
| 5 | 23 | 220 | 13200 | 611 | 27390 | 28000 | 2% | 0.02 |
| 6 | 20 | 1000 | 7600 | 2775 | 13825 | 16600 | 17% | 0.20 |
| 7 | 31 | 1500 | 5280 | 4163 | 3818 | 7980 | 52% | 1.09 |
| 8 | 22.5 | 1831 | 3790 | 5080 | — | 5080 | 100% | — |
| 9 | 22 | 1387 | 3030 | 3850 | — | 3850 | 100% | — |
| 10 | 27 | 1164 | 2440 | 3230 | — | 3230 | 100% | — |
| 11 | 88 | 920 | 2020 | 2553 | — | 2553 | 100% | — |

The ability of the process to selectively separate calcium chloride and sodium chloride in saline aqueous solutions is confirmed by examining the last two columns in each table, one designated "CaCl2 as % of TDS" that shows the percentage of total dissolved salts that is attributable to calcium chloride and the other designated as "Relative Conc. CaCl2 to NaCl" is the ratio of calcium chloride to sodium chloride present. The solute separation effected by the separation process is evident by comparing the percentage of total dissolved salts that is attributable to calcium chloride and relative concentrations of dissolved salts in the feed, respectively 31% and 0.45, to the same values determined for each effluent sample. For all three tests, effluent volumes represent by "Rinse Effluent Samples" 3 through 5 have the lowest "Calcium chloride as % of TDS" and "Relative Conc. CaCl2 to NaCl" values and would likely be suitable for purposes where saline water with significantly lower concentrations of calcium than the aqueous solution feed is acceptable.

Conversely, effluent volumes 1 plus 8 through 14 in Table 1, 1 plus 7 through 14 in Table 2, and 1 plus 8 through 11 in Table 3 have the highest "Calcium chloride as % of TDS" values and would likely be suitable for purposes where saline water with high concentrations of calcium is acceptable. The effluent volumes 2 plus 6 in Table 1, 2 plus 6 in Table 2, and 3 plus 6 and 7 in Table 3 all have "Calcium chloride as % of TDS" and "Relative Conc. CaCl2 to NaCl" values comparable to the aqueous feed solution.

The test results in all three examples confirmed the feasibility of separation of most of the sodium chloride and calcium chloride in a saline aqueous solution into effluent fractions with significant variation in the relative concentration of sodium chloride and calcium chloride.

The previous laboratory column test results confirm that a solute with relatively low affinity for amphoteric media such as sodium chloride and a solute with relatively high affinity for amphoteric media such as calcium chloride when present together in a saline aqueous solution can be readily separated by adsorption on amphoteric media followed by desorption with rinse water into two or more solutions that vary significantly in the relative concentration of the solutes when compared to the original aqueous solution. There are two potentially serious drawbacks with this technique when used as a salt separation method, namely, that large amounts of rinse water is required to effect the separation and that, if one of the effluent fractions is considered as a waste byproduct requiring disposal, the waste volume after salt separation could be greater than the original volume of aqueous solution before salt separation. These apparent drawbacks may be eliminated for many types of water treatment scenarios by applying the system and method described in FIG. 3.

Figure 3:
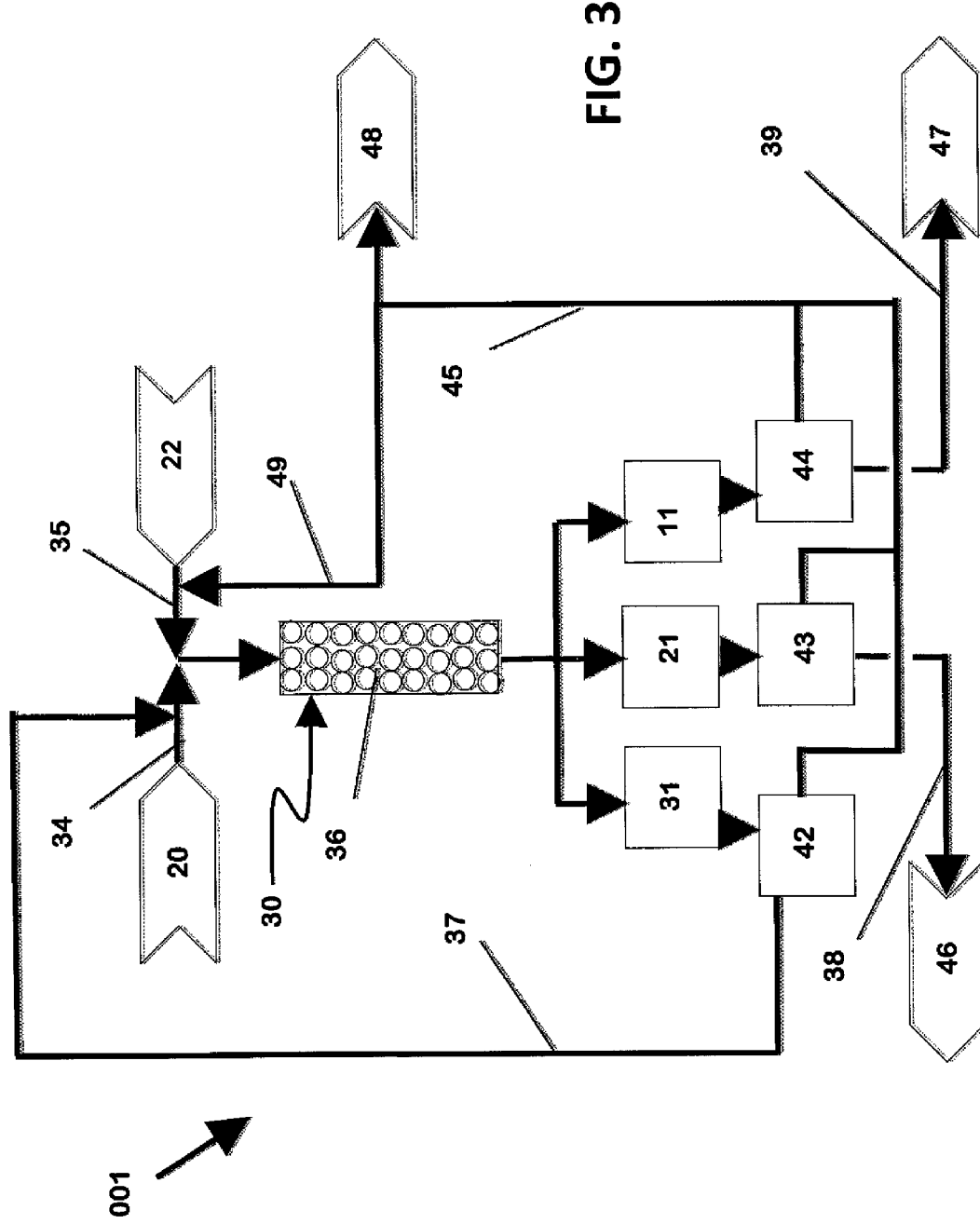
FIG. 3 is a flow diagram of a process to separate dissolve substances from aqueous solutions according to one embodiment of the invention that achieves salt separation with minimum rinse water and waste byproduct volume.

FIG. 3 is a schematic block diagram illustrating one embodiment of a system 001 that achieves salt separation while economically reducing both the amount of high quality rinse water required and the amount of waste byproduct volume that would require disposal. FIG. 3 includes a vessel 30 containing amphoteric media 36 through which an aqueous solution 20 containing solutes is introduced as feed 34 to allow the solutes to be adsorbed by the media. The aqueous solution is followed by rinse water 22 introduced 35 to the vessel following introduction of the aqueous solution 20 to selectively remove the adsorbed solutes from the media. The water that exits the column (effluent) 40 can subsequently be diverted into one or more containments, preferentially into a containment 21 for an acceptably low concentration of undesirable solute that can be subsequently used for other beneficial purposes 46, alternatively into a containment 11 for a high concentration of undesirable solute relative to the desirable solute that can be disposed of as waste byproduct, or alternatively into a containment 31 for effluent with relative concentrations of both solutes comparable to the aqueous solution 20 feed and at sufficiently low relative volumes such that fluid from this process can be recycled 37 to the feed of the vessel 30 containing amphoteric media 36 for reprocessing. Depending upon local circumstances and operating conditions, it may be more economical to first desalinate 42 the fluid in the containment for effluent 31 with relative concentrations of both solutes comparable to the aqueous solution 20 feed to minimize recycle volume and recover water for reuse as rinse water.

Following any or all containments 31 21 11, a desalination system 44 may be optionally provided that is optimized in both type and design characteristics to economically concentrate the dissolved salts in solution stored within the containment as well as produce water with adequately low salinity 45 that is suitable for use as amphoteric media rinse water 49 within the system 001 or other purposes 48 outside of the system. Concentrate from the desalination system may be used for a beneficial purpose, transported out of the system for disposal, or recycled to the feed of the vessel 30 containing amphoteric media 36 for reprocessing.

FIG. 4a is a schematic block diagram illustrating one embodiment of the direction of flow for aqueous solution 20 and rinse water 22 through a vessel 30 containing amphoteric media 36 in accordance with the present invention where the direction of flow is in the same or co-current direction for both fluids. FIG. 4b is a schematic block diagram illustrating another embodiment of the direction of flow for aqueous solution 20 and rinse water 22 through a vessel 30 containing amphoteric media 36 in accordance with the present invention where the direction of flow is in the opposite or countercurrent direction for one fluid compared to the other fluid. In this embodiment, effluent 40 from the column would exit at the bottom of the column when aqueous feed is introduced to the top of the column and other effluent 50 would exit the top of the column when rinse water is introduced to the bottom of the column. All effluent from either point of exit would be measured with one or more measurement methods to determine the total, individual, and/or relative solute concentrations and would be segregated for various intended purposes based upon comparison of those measurements to the water chemistry specifications required for each intended purpose. Those skilled in the art will acknowledge that variations are possible where either fluid can flow either upwards or downwards through the vessel 30 with the other fluid flowing either in the same or opposite direction.

Figure 5:
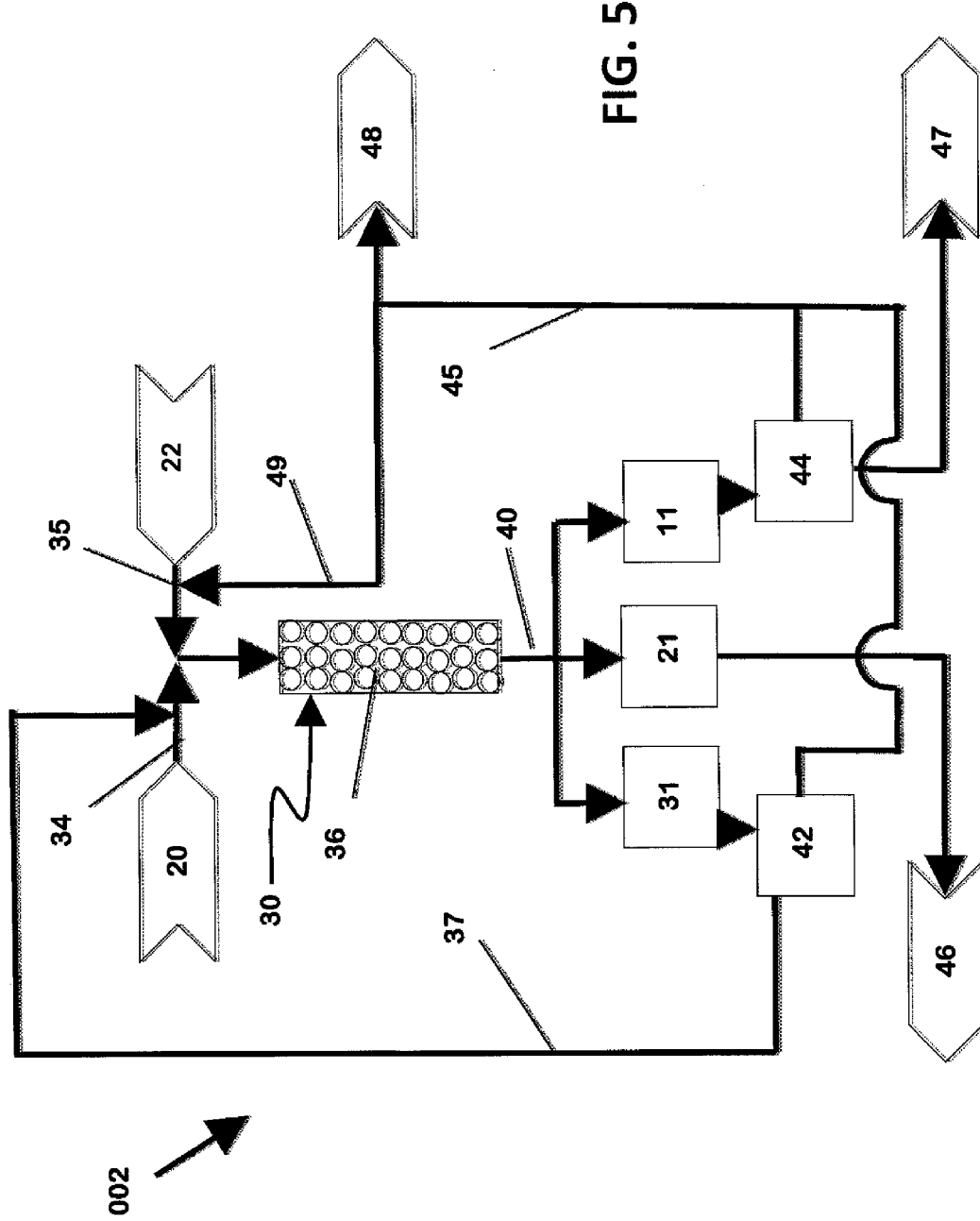
FIG. 5 is a flow diagram of a process to separate dissolve substances from aqueous solutions according to another embodiment of the invention where only the portion of effluent with high relative concentrations of undesirable solute is desalinated to recover water and minimize waste byproduct volume.

FIG. 5 is a schematic block diagram illustrating another embodiment of a system 002 that would be applied in circumstances where one of the beneficial purposes 46 requires subsequent addition of fresh water to meet the volume of fluid required for the beneficial purpose 46. An example of such a circumstance is the reuse of waste water from shale gas hydrofracturing, called flowback and produced water, where the flowback wastewater volume typically equals approximately 10 to 30% of the total water volume required for a subsequent hydrofracturing operation and water to make-up the 70 to 90% difference is generally drawn from local fresh water sources. Part or all of the fresh water required as make-up water for a subsequent hydrofracturing operation can first be used as amphoteric media 36 rinse water 35 such that there is no net increase in overall demand for external fresh water in order to accommodate the rinse water requirements of the salt separation process.

In system 002 when treating shale gas flowback for the beneficial purpose of producing water suitable for reuse from flowback, the primary treatment objective is to remove undesirable dissolved constituents that can form scale such as multivalent cations (calcium, barium, strontium, and magnesium) and interfere with chemicals used in the hydrofracturing operation. Multivalent cation chloride salts tend to have a greater affinity for amphoteric media then monovalent cation salts such as sodium chloride and potassium chloride, which typically comprise approximately 70% of the dissolved salts present in flowback and produced water, and thus are preferentially removed by the system 002. The effluent 40 would be segregated into separate containments with one containment containing fluid with low concentrations of undesirable constituents 21 and suitable for beneficial use such as hydrofracturing fluid 46, another containment containing primarily undesirable constituents present at relatively low concentrations 11 that would subsequently be further concentrated with a desalination process 44 to minimize both the waste volume 47 from the system 002 and recover low salinity water 45 suitable for rinsing 49 within the system 002 or other beneficial purposes 48 outside of the system 002, and another containment for effluent 31 with relative concentrations of both solutes comparable to the aqueous solution 20 feed and at sufficiently low relative volumes such that fluid from this process can be recycled 37 to the feed of the vessel 30 containing amphoteric media 36 for reprocessing. Depending upon local circumstances and operating conditions, it may be more economical to first desalinate 42 the fluid in the containment for effluent 31 with relative concentrations of both solutes comparable to the aqueous solution 20 feed to minimize recycle volume and recover water for reuse as rinse water.

Testing was conducted with an aqueous solution comprised of various dissolved salts at concentrations typically found in flowback waste water from shale gas hydrofracturing operations in the Marcellus region of Pennsylvania. The aqueous solution was synthesized with distilled water and laboratory grade sodium chloride, calcium chloride, magnesium chloride, barium chloride, and strontium chloride to produce an aqueous solution with the concentrations of metals described in TABLE 5 on the line labeled FEED. Typically the total salt concentration found in Marcellus flowback ranges from a low of 5,000 milligrams per liter during initial flowback flow and can increase to concentrations exceeding 200,000 milligrams per liter after three weeks of continuous flow. Most flowback when exiting the well contains total dissolved salt concentrations less than 60,000 milligrams per liter and this concentration was deemed to be a suitable representative salinity level for synthesized Marcellus flowback for the purposes of this test. Subsequent independent analyses confirmed that the actual total dissolved salt concentration in the synthesized sample was 59,941 milligrams per liter.

The laboratory scale column used previously to generate data described in TABLES 1, 2, and 3 was also used to evaluate the separation of divalent cations (barium, calcium, magnesium, and strontium) chloride salts from sodium chloride in the synthesized Marcellus test sample. Individual effluent fractions were analyzed for metals by CAPCO Analytical Services in Ventura, Calif. using EPA standard methods. The test column was fed with multiple cycles with each cycle consisting of 50 milliliters of synthesized sample and rinsed with 250 milliliters of distilled water and with all fluids entering the top of the column and exiting the bottom. The flow rate was constant at 3 milliliters per minute and temperature was in the range of 23-25 degrees Celsius. Effluent was collected and saved for subsequent analysis for the fourth cycle (A) and eighth cycle (B) with seven sequential portions collected in both cycle A and cycle B. The volume of fluid collected and concentrations of individual metals in the collected effluent portions is described in TABLE 4 in the data ranges identified as Cycle 4 (A) and Cycle 8 (B). Seven portions were collected for each cycle and designated A1 through A7 for Cycle A and B1 through B7 for Cycle B.

TABLE 4

METALS ANALYSIS FOR
SYNTHESIZED MARCELLUS FLOWBACK AND
TEST COLUMN EFFLUENT SAMPLES

|  | Vol (ml) | Metal/EPA Method POL (mg/L) Unit/Label/ Sample ID | Barium/ 200.8 0.1 mg/L | Calcium/ 200.7 10 mg/L | Magnesium/ 200.7 10 mg/L | Sodium/ 200.7 20 mg/L | Strontium/ 200.8 0.1 mg/L |
|---|---|---|---|---|---|---|---|
| Feed | 50 | 111521-01/FEED | 2300 | 3700 | 400 | 16000 | 1800 |
| Cycle 4 (A) | 40 | 111521-02/A1 | 230 | 640 | 33 | 48 | 150 |
|  | 20 | 111521-03/A2 | 74 | 210 | 11 | 1000 | 30 |
|  | 40 | 111521-04/A3 | 39 | 120 | 11 | 10000 | 17 |
|  | 10 | 111521-05/A4 | 110 | 260 | 100 | 9000 | 180 |
|  | 10 | 111521-06/A5 | 400 | 630 | 150 | 6200 | 830 |
|  | 20 | 111521-07/A6 | 570 | 1100 | 120 | 3300 | 480 |
|  | 135 | 111521-08/A7 | 420 | 1000 | 61 | 530 | 280 |
| Cycle 8 (B) | 40 | 111521-09/B1 | 250 | 620 | 33 | 87 | 150 |
|  | 10 | 111521-10/B2 | 73 | 190 | 11 | 2100 | 37 |
|  | 49 | 111521-11/B3 | 180 | 300 | 97 | 11000 | 200 |
|  | 10 | 111521-12/B4 | 630 | 880 | 100 | 7100 | 533 |
|  | 10 | 111521-13/B5 | 640 | 1000 | 110 | 4800 | 480 |
|  | 20 | 111521-14/B6 | 650 | 1000 | 85 | 2800 | 400 |
|  | 136 | 111521-15/B7 | 470 | 830 | 87 | 640 | 280 |

The volume of each sample and the sum of divalent cation salts (sum of chloride salts of barium, calcium, strontium, and magnesium) expressed as a percentage of the total dissolved salts (% Divalent cation salt) in each sample is presented in Table 5.

TABLE 5

DIVALENT CATION SALT AS A PERCENTAGE
OF TOTAL DISSOLVED SALT FOR MARCELLUS
TEST COLUMN EFFLUENT SAMPLES

| | Volume (mL) | | % Divalent cation salt | |
|---|---|---|---|---|
| Sample No. | Cycle A | Cycle B | Cycle A | Cycle B |
| 1 | 40 | 40 | 95% | 92% |
| 2 | 20 | 10 | 15% | 13% |
| 3 | 40 | 49 | 2% | 6% |
| 4 | 10 | 10 | 6% | 23% |
| 5 | 10 | 10 | 20% | 31% |
| 6 | 20 | 20 | 40% | 41% |
| 7 | 135 | 136 | 76% | 70% |
| Total | 275 | 275 | | |

The "% Divalent cation salt" value in the synthesized feed was 32%; variations in this value for each sample reflect separation of sodium chloride salt from the divalent cation salts. The highest and lowest values for "% Divalent cation salt" indicates the greatest degree of salt separation. The lowest values are found in samples 2, 3, and 4 which collectively represent about 25% of the effluent and in the practice of the system 002 would be suitable for use as hydrofracturing fluid 46 either as such or with additional treatment if even lower values of "% Divalent cation salt" was desirable. The highest values are found in the first and last samples (1 and 7) which collectively represent about 64% of the total effluent and in the practice of the system 002 would be segregated 11 and concentrated with a desalination process 44 to minimize both the waste volume 47 from the system 002 and to recover low salinity water 45 suitable for rinsing 49 within the system 002 or other beneficial purposes 48 outside of the system 002.

The balance of the effluent fractions (samples 5 and 6) are comparable in "% Divalent cation salt" value to the feed. There are several options envisioned for the disposition of these fractions in the system 002 that will depend upon local requirements for hydrofracturing fluid 46 quality. The best option is to include this fraction with the effluent fraction that is suitable for use as hydrofracturing fluid 46 which is practical if the "% Divalent cation salt" in the blend of the two fractions is within acceptable limits for hydrofracturing fluid 46 quality. Another option is to include this fraction with the fraction that is segregated 11 and concentrated with a desalination process 44 to minimize both the waste volume 47 from the system 002 and recover low salinity water 45 suitable for rinsing 49 within the system 002 or other beneficial purposes 48 outside of the system 002. Another option is to send this fraction to a containment for effluent 31 with relative concentrations of both solutes comparable to the aqueous solution 20 feed and at sufficiently low relative volumes such that fluid from this process can be recycled 37 to the feed of the vessel 30 for reprocessing. Depending upon local circumstances and operating conditions, it may be more economical to first desalinate 42 the fluid in the containment for effluent 31 with relative concentrations of both solutes comparable to the aqueous solution 20 feed to minimize recycle volume and recover water for reuse as rinse water.

The "% Divalent cation salt" in the effluent fractions with the lowest and highest "% Divalent cation salt" can be decreased and increased respectively by increasing the rinse volume. Additional rinse volume further reduces the concentration of divalent cation salts remaining in the amphoteric media at the end of the cycle which would result in a more favorable equilibrium for divalent cation salt removal when the amphoteric media receives the feed solution during the subsequent cycle. Those skilled in the art will recognize that a longer rinse period would lengthen the treatment cycle, requiring higher capacity desalination units to recover the additional effluent waste volume 47 and other changes to the system 002 design such as increased installed amphoteric media volume necessary to maintain a constant treatment capacity relative to treatment demand. Ultimately any system 002 will be designed and operated to accommodate the unique chemistry and other local conditions while meeting the hydrofracturing fluid 46 quality requirements at the lowest net operation cost that includes offsite waste disposal, electricity, and amortization of the capital cost for the system 002.

The effluent volumes and their respective individual metals concentrations described in TABLE 5 were also used to estimate the performance of a desalination process 44 to minimize both the waste volume 47 from the system 002 and to recover low salinity water 45 suitable for rinsing 49 within the system 002 or other beneficial purposes 48 outside of the system 002. The first step in this estimate was to assess the relative quantities of and dissolved salt concentrations in various portions of effluent 40 with the assumption that all effluent would be diverted only to a beneficial purpose 46, in this case subsequent hydrofracturing and thus called the "Frac" fraction in TABLE 6, or to a desalination process 44, called the "Waste" fraction in TABLE 6, to minimize both the waste volume 47 from the system 002 and to recover low salinity water 45 for rinsing or other purposes. This estimate is presented in TABLE 6 only for the measurements taken for Cycle B shown in Table 5 since Cycle B is more representative of equilibrium conditions existing between salts adsorbed and desorbed from the amphoteric media 36 and salts present in the synthesized feed.

TABLE 6

ESTIMATED VOLUMES AND SALT CONCENTRATIONS FOR EFFLUENT PORTIONS DURING CYCLE 8 OF MARCELLUS TESTING

| Effluent Fraction | Volume mL | BaCl2, mq/L | CaCl2, mq/L | MgCl2, mq/L | NaCl, mq/L | SrCl2, mq/L | TDS, mq/L |
|---|---|---|---|---|---|---|---|
| Frac | 79 | 501 | 1275 | 375 | 21764 | 458 | 24373 |
| Waste | 196 | 788 | 2227 | 216 | 1901 | 485 | 5618 |

The first important observation from this table is that the Frac volume of 79 ml is only 52% greater than the "synthesized Marcellus flowback" feed volume of 50 ml. Since typically additional fresh water exceeding 300% of flowback volume will be required to use flowback for hydrofracturing, there is no incentive to reduce the Frac effluent fraction further with desalination.

Desalination of the Waste effluent fraction is still desirable to minimize offsite waste volume and the Total Dissolved Salts (TDS) levels in the Waste effluent fraction is suitable for desalination with conventional reverse osmosis membrane systems as well as other commercially available desalination processes that typically desalinate feeds with TDS levels exceeding 30,000 mg/L such as is common for seawater desalination.

The suitability of reverse osmosis was examined using two calculation methods. The first method was an approximation of the potential for concentration that was calculated by dividing the maximum pressure generated by typical conventional seawater desalination reverse osmosis membranes (54 bars) by the total calculated osmotic pressure in the Waste effluent fraction based upon the salt concentrations in the waste effluent (2.695 bars) to arrive at a maximum theoretical concentration factor of 20.57 equivalent to 95.1% recovery. The second method was an approximation using a reverse osmosis projection based upon calculations performed by Hydranautics Membrane Solutions Design Software, v 2011. The Hydranautics projection proposed a two stage system with the first stage operating at 75% water recovery with a feed pressure of 158.1 psi and a second stage treating the concentrating from the first stage at 80% recovery with a feed pressure of 395.7 psi with an overall recovery of 95% of the feed (Waste in TABLE 6) with salinity of approximately 150 mg/L (comparable to rinse water salinity used in rinse tests). Estimated pump electricity required was estimated to be 0.28 kwH per barrel (42 gallons) of Waste fed to the desalination system.

Neither method for estimation of desalination performance was considered to be precise but rather served only to confirm expectations that conventional reverse osmosis was likely to be a viable economic desalination process 44 to minimize both the waste volume 47 from the system 002 and to recover low salinity water 45 suitable for rinsing 49 within the system 002 or other beneficial purposes 48 outside of the system 002. Other desalination processes may be included within the system and method and that many operating conditions such as design pressure, flux rates, and any other operating conditions normally determined for a desalination process based upon aqueous solution feed chemistry and desired effluent characteristics, are possible.

Figure 6:
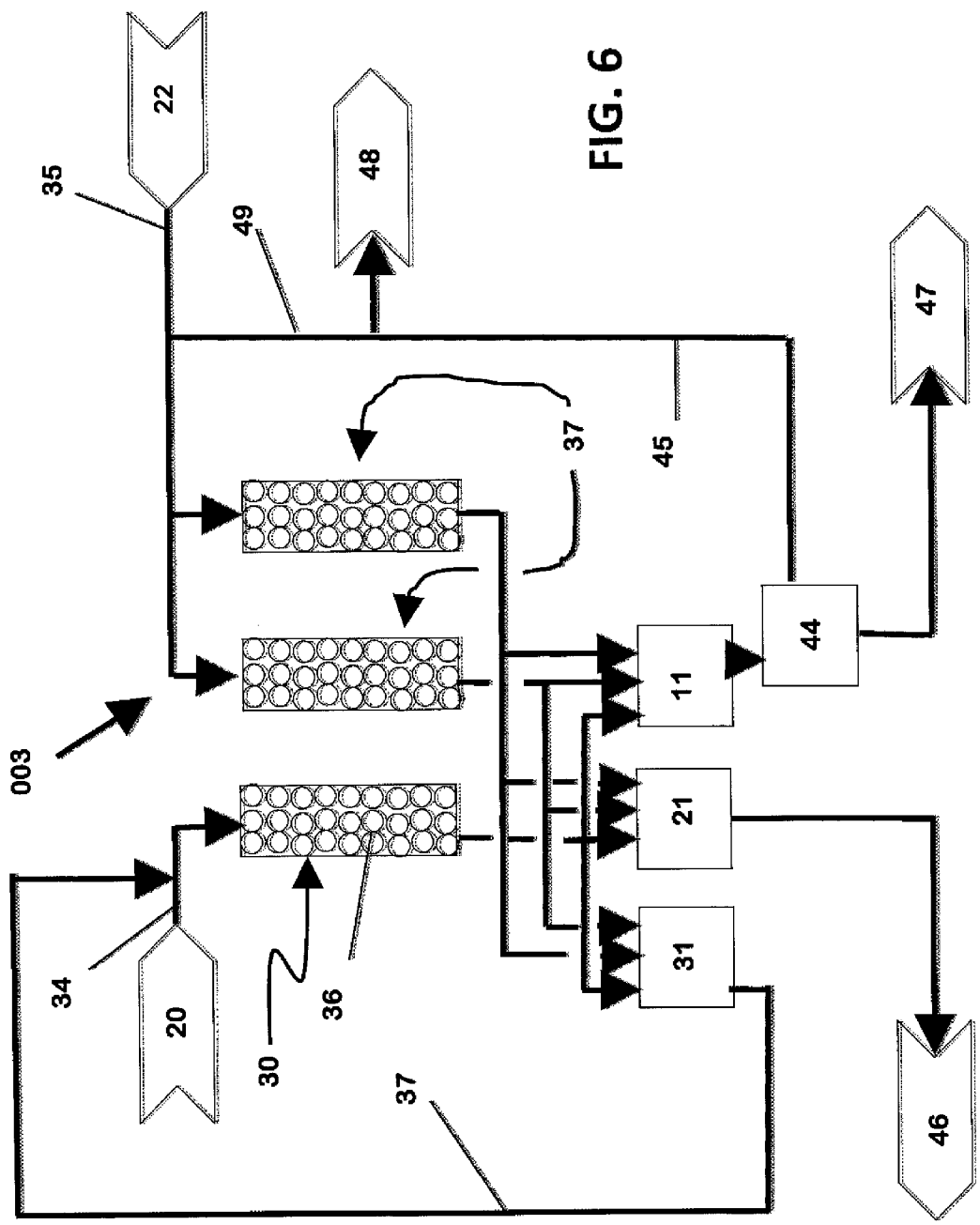
FIG. 6 is a flow diagram of a process to separate dissolve substances from aqueous solutions according to another embodiment of the invention with one column treating aqueous solution feed while at the same time other columns are receiving rinse water in parallel at varying stages within the treatment cycle.

FIG. 6 is a schematic block diagram illustrating another embodiment of a system 003 that would be applied in circumstances where two or more vessels 37 containing amphoteric media 36 would be operating in the rinse portion of the cycle in parallel while one or more other vessels 30 containing amphoteric media 36 would be operating in the feed portion of the cycle. This mode of operation is anticipated primarily for feed conditions when the concentration of dissolved substances with a high affinity for the amphoteric media 36 is relatively high compared to normal circumstances, such as when treating flowback water near the end of the flowback cycle or produced water that continues to flow from shale gas production wells after the end of the flowback cycle.

Figure 7:
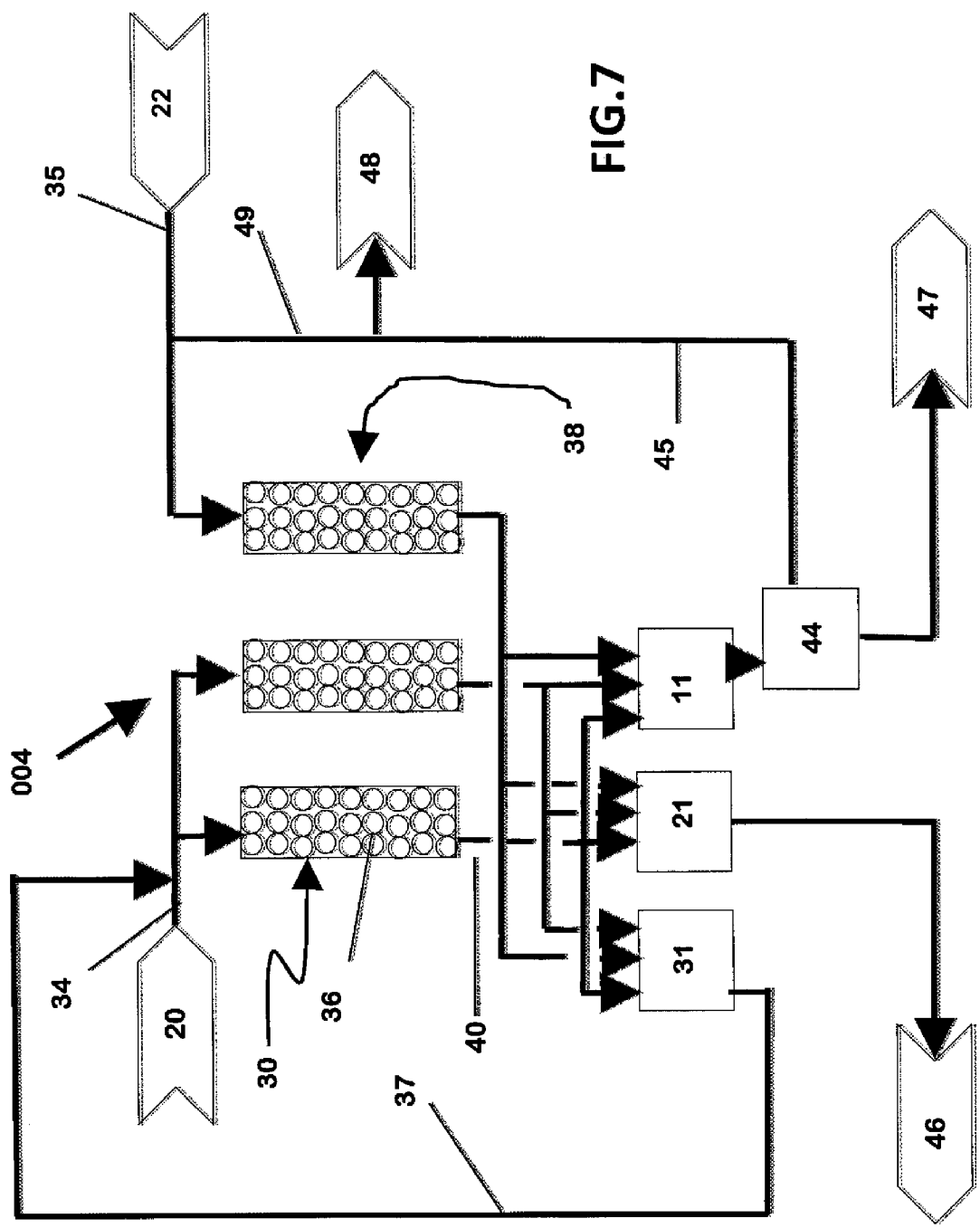
FIG. 7 is a flow diagram of a process to separate dissolve substances from aqueous solutions according to another embodiment of the invention illustrating operation with two or more columns receiving aqueous solution in parallel during one part of a treatment cycle while at the same time one or more other ion retardation columns are receiving rinse water at varying stages within the treatment cycle.

FIG. 7 is a schematic block diagram illustrating another embodiment of a system 004 that would be applied in circumstances where two or more vessels 30 containing amphoteric media 36 would be operating in the feed portion of the cycle in parallel while one or more other vessels 37 containing amphoteric media 36 would be operating in the rinse portion of the cycle. This mode of operation is anticipated primarily for feed conditions when the concentration of dissolved substances with a high affinity for the amphoteric media 36 is relatively low compared to normal circumstances, such as when treating flowback water near the middle of the flowback cycle.

Figure 8:
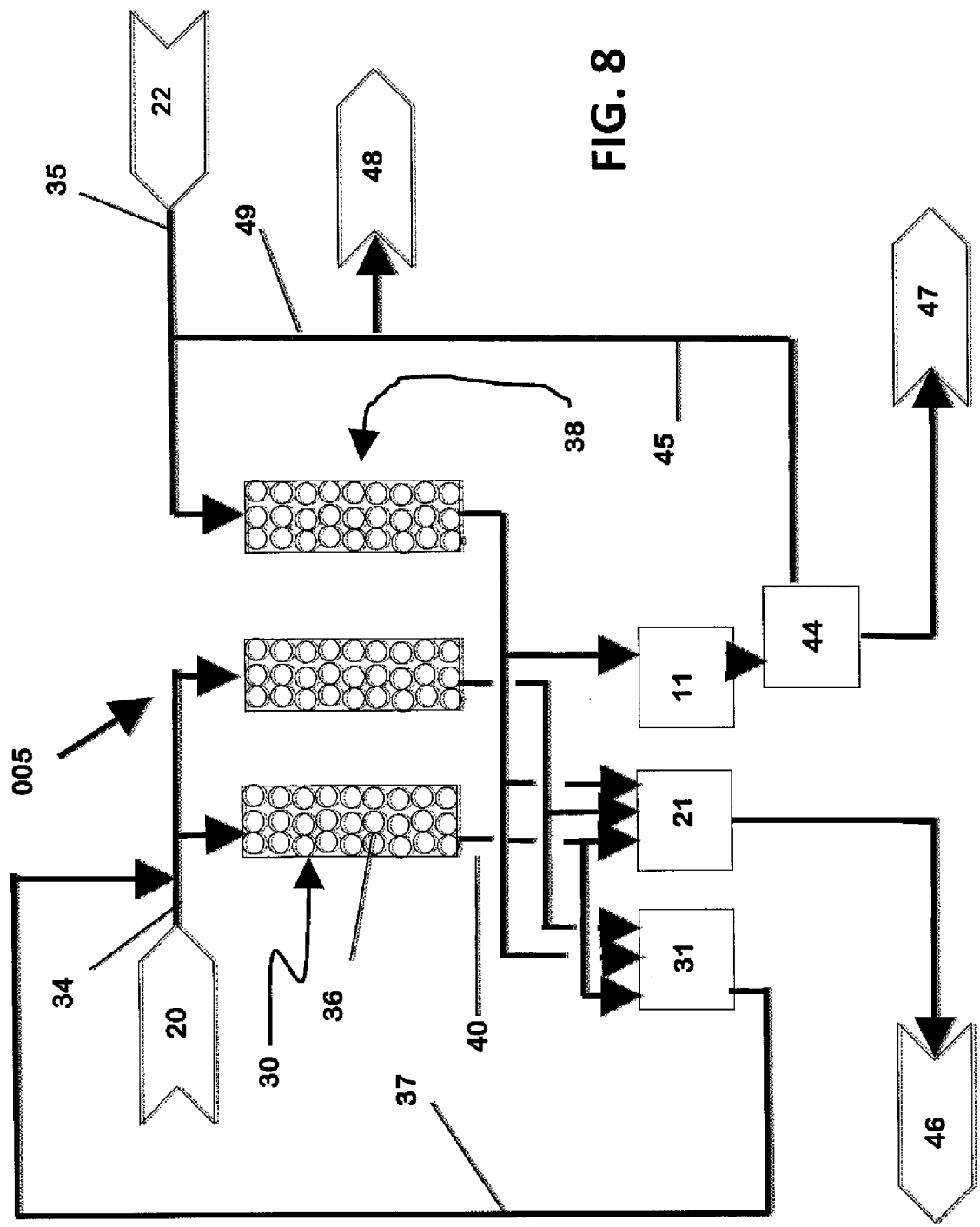
FIG. 8 is a flow diagram of a process to separate dissolve substances from aqueous solutions according to another embodiment of the invention illustrating operation with one or more or all columns in a system receiving aqueous solution at high rates suitable only for adsorption of undesirable solutes.

FIG. 8 is a schematic block diagram illustrating another embodiment of a system 005 that would be applied in circumstances where two or more and potentially all of the vessels 30 containing amphoteric media 36 in the system would be operating in the feed portion of the cycle in parallel while no or one or more vessels 37 containing amphoteric media 36 would be operating in the rinse portion of the cycle. It is further embodied that the feed rate in the vessels 30 receiving flowback may be operated at flow rates significantly above the flow rate range necessary for fractionation of a mixture of salts as envisioned for the system 002 in FIG. 5 but below a maximum flow rate that remains suitable for direct removal of divalent cation salts from the aqueous solution feed 20 adequately to allow treatment of the aqueous solution feed 20 at the highest possible flow rate while still producing effluent 40 that is suitable for use as hydrofracturing fluid 46. It is anticipated that under the operating conditions envisioned for the system 005 FIG. 8 that the primary purpose of rinsing the amphoteric media 36 is to remove as much of the adsorbed salts from the amphoteric media 36 as possible to maximize the capacity for adsorption of divalent cation salts during the next feed portion of the cycle. Any portion of effluent from the vessel 37 may be diverted to use as hydrofracturing fluid 46 if suitable for use or alternatively to recycle 37 if the total and relative concentrations of dissolved salts are in the appropriate ranges. However, it is anticipated that during the rinse operation envisioned for the system 005 in FIG. 8 most or all of the effluent 40 from the column 37 in rinse will be diverted to a desalination process 44 to minimize both the waste volume 47 from the system 006 and to recover low salinity water 45 suitable for rinsing 49 within the system 006 or other beneficial purposes 48 outside of the system 006. This mode of operation is anticipated primarily for aqueous solution feed conditions when the concentration of dissolved substances with a high affinity for the amphoteric media 36 is adequately low. Under such conditions the amphoteric media 36 can satisfactorily convert the aqueous solution feed to effluent suitable for beneficial use at higher flow rates and/or for longer feed cycle durations than conditions when much higher concentrations of dissolved substances with a high affinity are present. In the example of treating flowback water from shale gas operations and under typical circumstances when the initial flowback flow rate may be more than ten times the median flow rate during the entire flowback period and the initial concentration of dissolved substances with a high affinity for the amphoteric media 36 may be less than one-tenth of the median concentration during the entire flowback period, operation in accordance with this embodiment of the system 005 would reduce the volume of flowback requiring onsite storage and in many cases eliminate the requirement for onsite storage of flowback waste water during the flowback treatment period.

Figure 9:
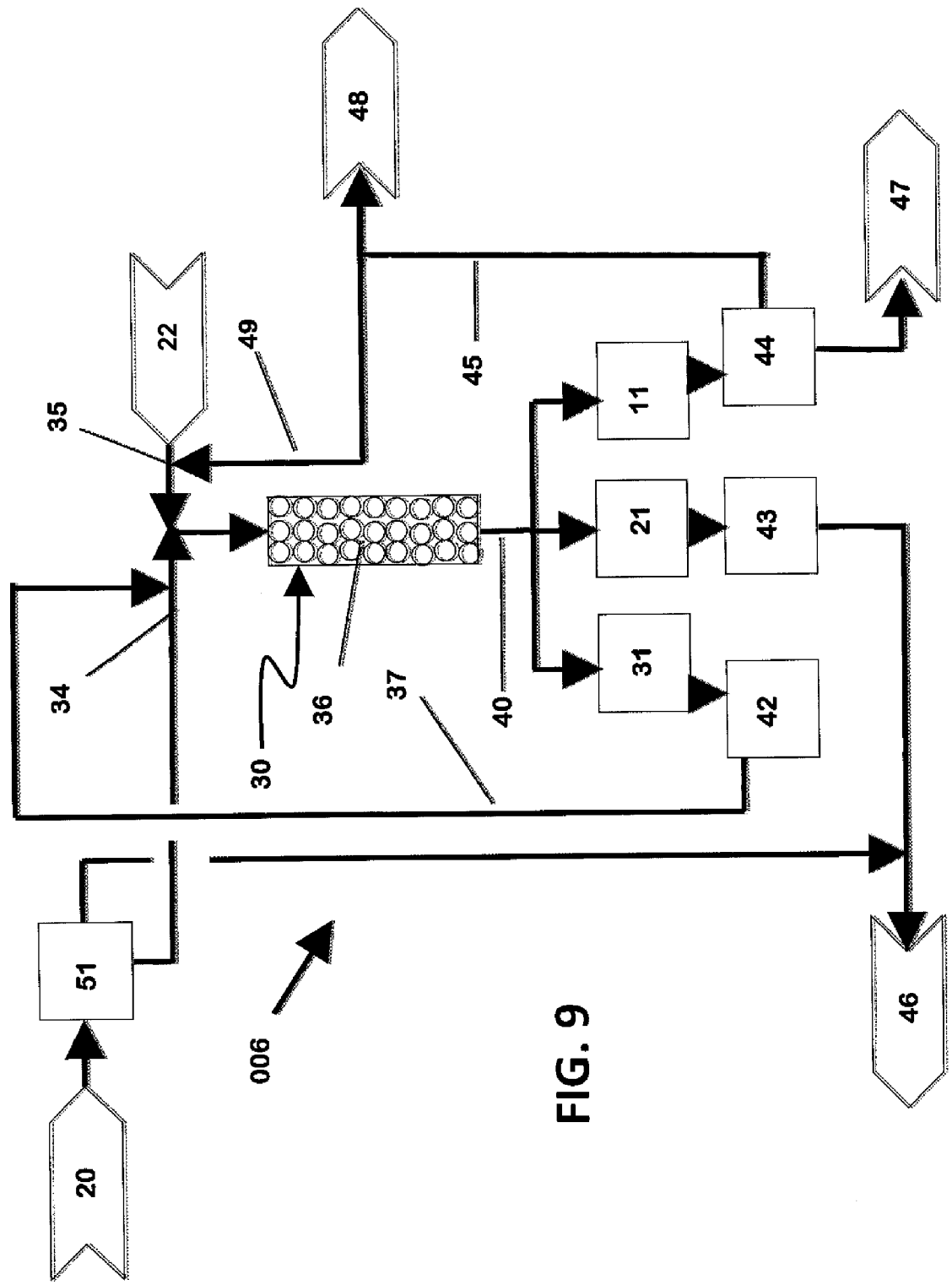
FIG. 9 is a flow diagram of a process to separate dissolve substances from aqueous solutions according to another embodiment of the invention illustrating where dissolved substances in the aqueous solution under low salinity feed conditions can first be concentrated in a desalination process before separation via ion retardation.

FIG. 9 is a schematic block diagram illustrating another embodiment of a system 006 that would be applied in circumstances where the total dissolved salt concentration in the feed solution 20 is sufficiently low so as to allow a desalination process 51 to be used as the first treatment step to produce water suitable for beneficial purposes 43 such as hydrofracturing fluid 46 when the treatment is applied to shale gas wastewater. In the system 006 the concentrate from the desalination process becomes the feed to the amphoteric media 36 to effect separation of dissolved solutes into fractions suitable for beneficial purposes such as hydrofracturing fluid 46, desalination 42 44 for the purpose of recovering water for rinse and concentration of salts into separate smaller volumes suitable either for recycle 37 or for reprocessing or disposal as a waste byproduct 47. The desalination process 51 in this embodiment may be either a separate desalination process that is dedicated to be used as the first treatment step to produce water suitable for beneficial purposes such as hydrofracturing fluid 46, or can be a common desalination process that is used during one part of the flowback cycle as the first treatment step to produce water suitable for beneficial purposes such as hydrofracturing fluid 46 and during other parts of the treatment cycle be used for desalination 42 44 for the purpose of recovering water for rinse and concentration of salts into separate smaller volumes suitable either for recycle 37 or for reprocessing or disposal as a waste byproduct 47.

Figure 10:
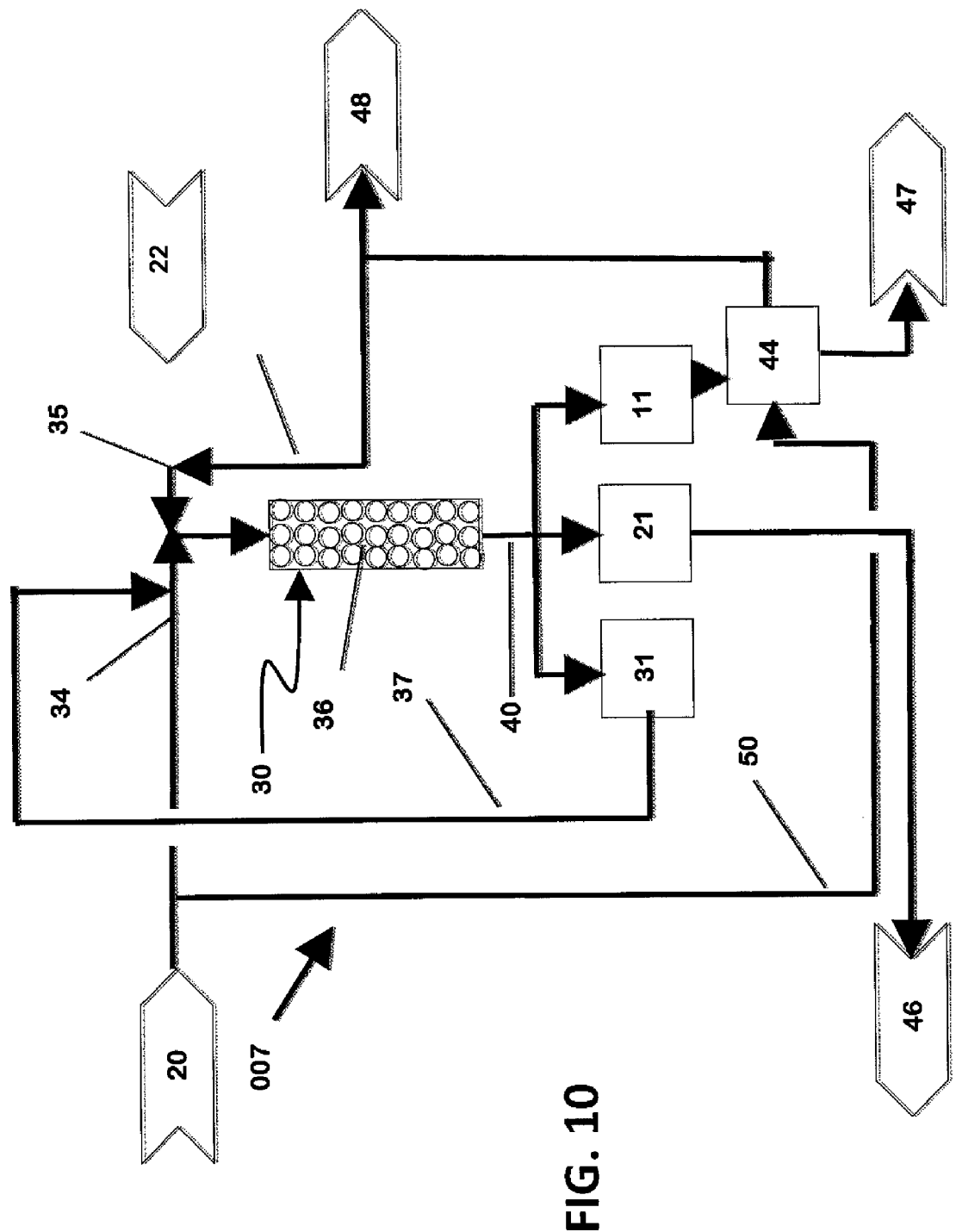
FIG. 10 is a flow diagram of a process to separate dissolve substances from aqueous solutions according to another embodiment of the invention where a portion of the saline feed is desalinated to meet the rinse water requirements of the ion retardation process.

FIG. 10 is a schematic block diagram illustrating another embodiment of a system 007 that would be applied in circumstances where fresh water resources desired for the beneficial purpose are scarce and saline sources, such as seawater or agricultural drainage, are abundant but contain relatively low but still unacceptably high concentrations of undesirable constituents, such as divalent cations, whose salts have a high affinity for amphoteric media 36. As an example, standard seawater typically contains concentrations of magnesium and calcium hardness approximately in the range of 3,000 mg/L that exceeds a desired maximum of 1,000 mg/L for hardness. In the example of producing water from seawater that is suitable for hydrofracturing fluid, the system 007 described in FIG. 10 would treat seawater 20 in the influent 34 for purposes of removal of hardness down to the desired concentration suitable for hydrofracturing 46. The amphoteric media 36 would be periodically rinsed with low salinity water 35 and the effluent 40 during the rinsing operation would be diverted based upon total and relative salt concentration either to be recycled to the feed for reprocessing 37, a beneficial purpose such as hydrofracturing 46, or desalination 42 44 for the purpose of recovering water for rinse and concentration of salts into separate smaller volumes suitable for recycle 37 for reprocessing or disposal as a waste salt byproduct 47 back to the ocean that is comparable in total salinity to waste from seawater desalination systems. In the case of severe shortage of fresh water, a portion of the feed water 20 can be diverted 50 to a desalination system suitably designed for desalination of a feed water with the salinity conditions found in the feed water 20. When the feed water 20 is seawater and when the desalination process 47 is a two-stage reverse osmosis desalination system consisting of a relatively low pressure first stage primarily tasked to economically recover low salinity water for rinse water supply and a relatively high pressure second stage primarily tasked to achieve maximum salt concentration for the waste stream 47, capital and operating cost efficiencies can be realized by increasing the capacity of the second stage to accommodate the feed of seawater in order to produce the additional fresh water required for rinsing. Also in the case of when the feed water 20 is seawater, it is anticipated that the waste 47 from the desalination process can be safely discharged to the sea for disposal under circumstances similar to any seawater desalination system.

Figure 11:
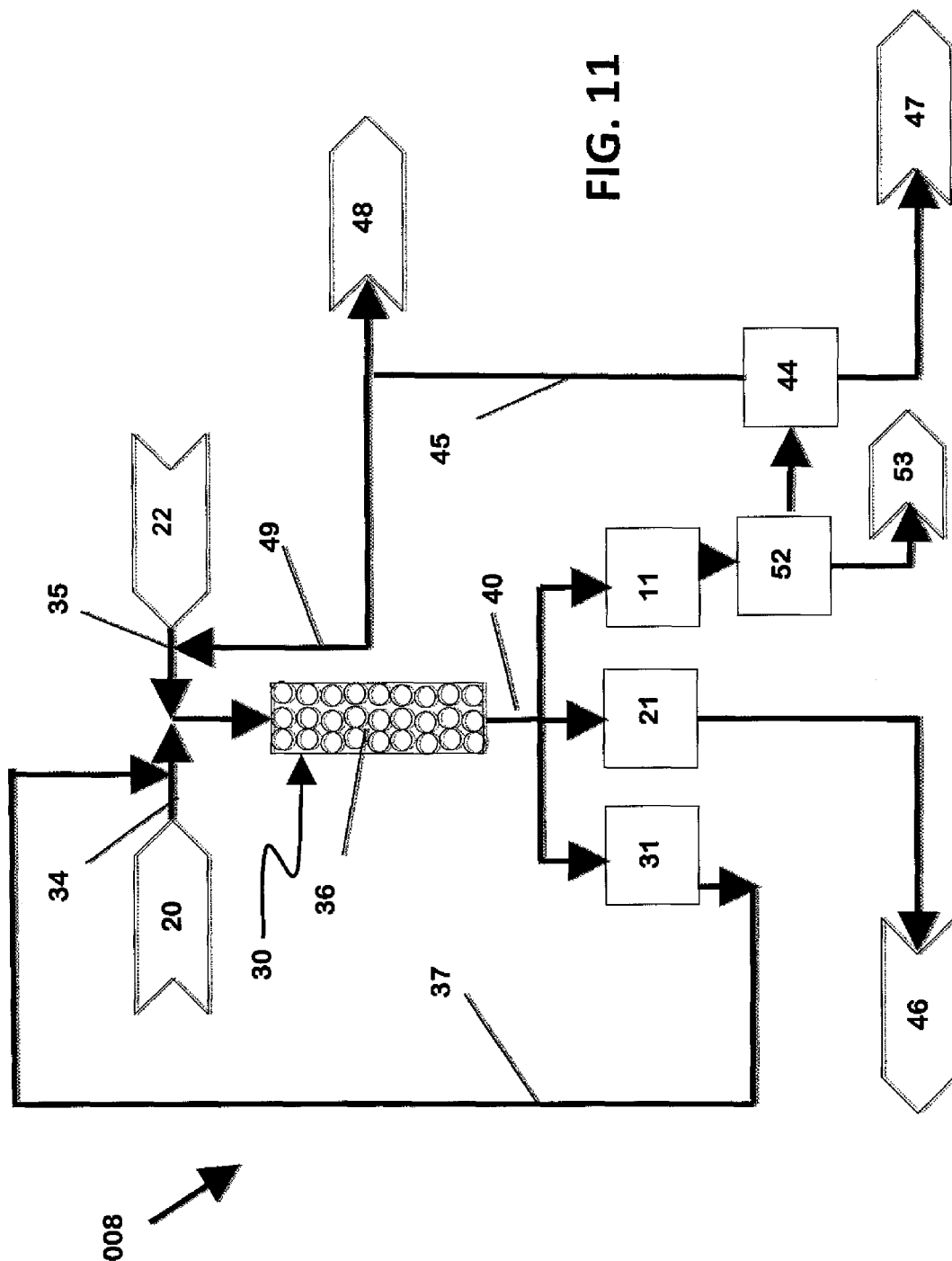
FIG. 11 is a flow diagram of a process to separate dissolve substances from aqueous solutions according to another embodiment of the invention illustrating operation where a portion of effluent with high relative concentrations of undesirable solute is first treated to remove contaminants that if removed can improve the performance of the desalination process used to recover water and minimize waste byproduct volume.

FIG. 11 is a schematic block diagram illustrating another embodiment of a system 008 that would be applied in circumstances to treat fluid in the containment containing primarily undesirable constituents present at relatively low concentrations 11 that would subsequently be further concentrated with a desalination process 44 to minimize both the waste volume 47 from the system 008 and recover low salinity water 45 suitable for rinsing 49 within the system 008 or other beneficial purposes 48 outside of the system 008 when said fluid contains contaminants that if removed, via a separate process 52 that is economically viable when said removal can be achieved under the relatively low concentration of dissolved salts in the fluid 11, can improve the operation of the desalination system 44 or reduce the cost or ease of handling of the final waste stream 47 from the system 008. Examples of the former include but are not limited to dissolved iron in the ferric form that can precipitate 53 when concentrated within desalination devices such as reverse osmosis and can be removed via a variety of iron removal media that perform more effectively at total dissolved salt concentrations found in the fluid 11 than found in the feed 20 to the system 008. Examples of the latter include but are not limited to radionuclide compounds such as radium 226 that significantly increase the cost of waste 47 disposal when present and can be removed by various adsorbents that provide much greater removal capacity (mass of compound removed per unit volume of adsorbent) at the lower total dissolved salt concentrations found in the fluid 11 compared to the total dissolved salt concentrations in the feed 20 to the system 008. Such a relationship was cited by Snoeying et. al. in the EPA Environmental Research Brief EPA/600/M-86/021 February 1987 where it was noted that for Dow Chemical's Radium-Selective Complexer (RSC) "the capacity of this resin for waters with low total dissolved solids (TDS) (<1,000 to 2,000 mg/L is in excess of 30,000 pCi/dry g; however, if the TDS is increased to about 40,000 mg/L the capacity drops to 200 to 300 pCi/dry g." The embodiment of a system 008 when applied to treating shale gas flowback for the beneficial purpose of producing water suitable for reuse from flowback and when the primary treatment objective is to remove undesirable dissolved constituents that can form scale such as multivalent cations (calcium, barium, strontium, and magnesium) provides the additional advantage of facilitating the efficient removal of specific contaminants, such as radium 226, when the efficiency of the removal process is significantly improved by performing the removal process under treatment conditions with total dissolve salt concentrations that are significantly less than found in the original shale gas flowback wastewater.

Figure 12:
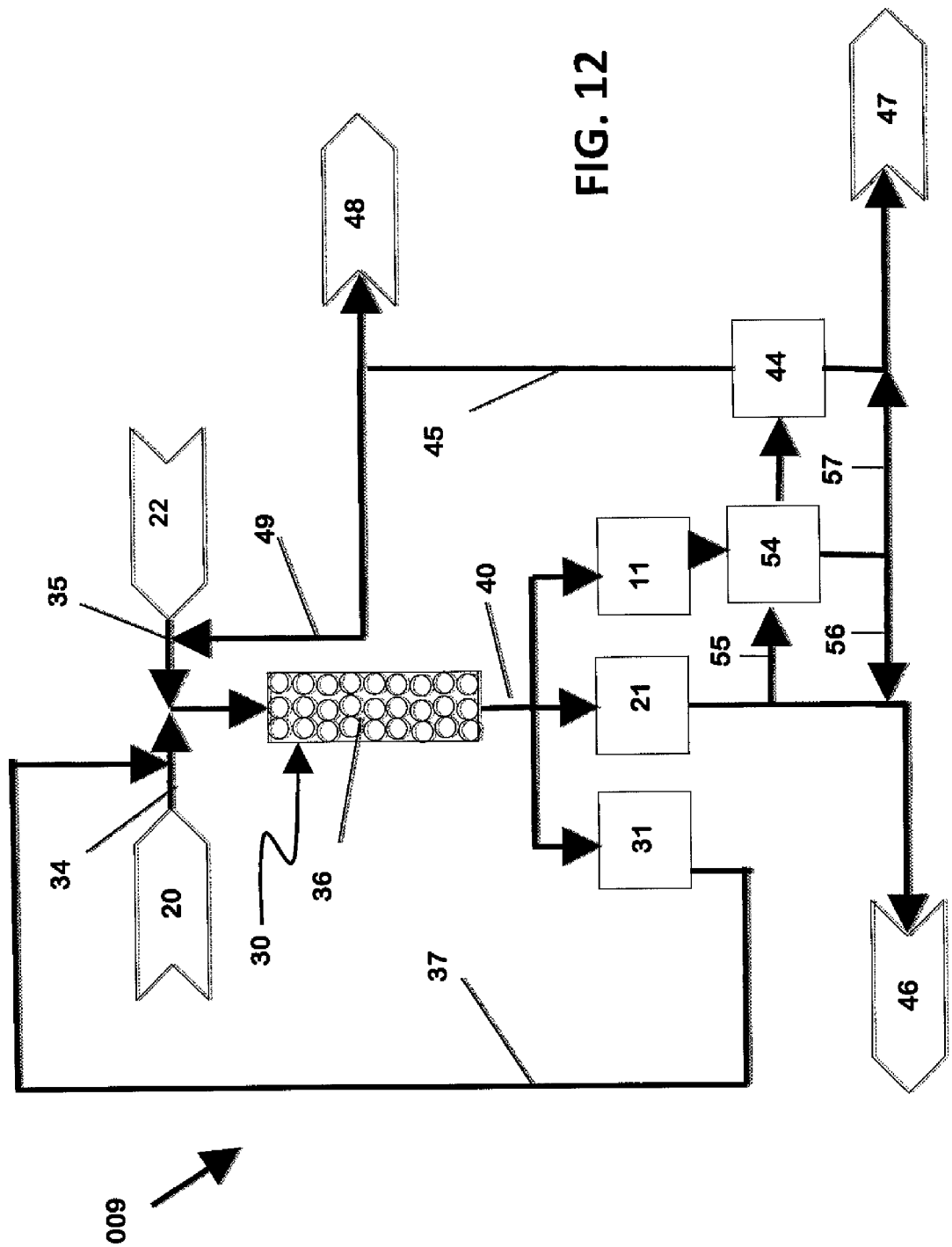
FIG. 12 is a flow diagram of a process to separate dissolve substances from aqueous solutions according to another embodiment of the invention illustrating operation where a portion of effluent with high relative concentrations of undesirable solute is first treated with strong base anion resin to remove contaminants that if removed can improve the performance of the desalination process used to recover water and minimize waste byproduct volume. The strong base anion resin is subsequently regenerated with a brine solution either produced from the saline feed, saline effluent from the process with salinity suitable for regeneration, or a saline solution produced by adding salt to low salinity water

FIG. 12 is a schematic block diagram illustrating another embodiment of a system 009 that would be applied in circumstances to treat fluid in the containment containing primarily undesirable constituents present at relatively low concentrations 11 that would subsequently be further concentrated with a desalination process 44 to minimize both the waste volume 47 from the system 009 and recover low salinity water 45 suitable for rinsing 49 within the system 009 or other beneficial purposes 48 outside of the system 009 when said fluid contains contaminants that if removed, via a separate process 54 that is economically viable when said removal can be achieved under the relatively low concentration of dissolved salts in the fluid 11, can improve the operation of the desalination system 44 or reduce the cost or ease of handling of the final waste stream 47 from the system 009, and said contaminants are acceptable for the beneficial purpose 46, and said contaminants can be first removed from the fluid 11 with a process operating under the chemistry conditions of the fluid 11 and can be subsequently removed from the process with fluid with low concentrations of undesirable constituents 21 and suitable for beneficial use as hydrofracturing fluid 46. Examples would include but not be limited to sulfate anions if present in the fluid 11 that may otherwise precipitate as barium sulfate upon concentration within the desalination system 44 if not removed prior to the desalination system 44. Under the relatively lower total dissolved salt conditions in the fluid 11 sulfate ions can readily be removed from the fluid 11 via exchange with chloride anions that are attached to the functional groups of strong base anion exchange resin and be subsequently removed from the strong base anion exchange resin with a higher concentration of chloride ions present as sodium chloride in a process called resin regeneration. Resin regeneration can be accomplished with a fluid 55 containing much higher concentrations of chloride ions than found present in the fluid 11 containing relatively low concentrations of chlorides that can be provided by either the conventional approach of dissolving sodium chloride salt into water containing low concentrations of divalent cations or by the approach in the system 009 where a portion of the saline water in the saline feed 20 or fluid recovered for beneficial use 21 is introduced 55 to remove sulfate ions attached to the strong base anion media in the treatment process 54 via the exchange of chloride ions present in the saline water recovered for beneficial use 21, a process also know as resin regeneration. The effluent from the strong base anion exchange resin unit 54 when such saline water is used to remove sulfate ions can be either used for a beneficial use such as hydrofracturing fluid 46 or discharged from the process as part of the waste volume 47 from the system 009. Said fluid contains solutes, such as sulfate, that upon removal from the strong base anion resin in a separate process 54 via resin regeneration 59, may be of suitable concentration to react with other chemical constituents such as barium, strontium, radium, and calcium in the waste from the desalination system 44 to form water insoluble precipitates that can be separated from the waste volume 47 from the system 009 via a variety of settling and filtration methods including clarification and filtration for a variety of purposes such as removal of certain toxic or otherwise undesirable contaminants such as barium and radium from the waste volume 47 from the system 009. The flow configurations of the fluid with relatively low concentration of dissolved salts in the fluid 11 and the fluid 55 containing much higher concentrations of chloride ions than found present in the fluid 11 can flow through the strong base anion resin in the separate process 54 either in the same direction known as cocurrent regeneration or in the opposite direction known as countercurrent regeneration.

Figure 13:
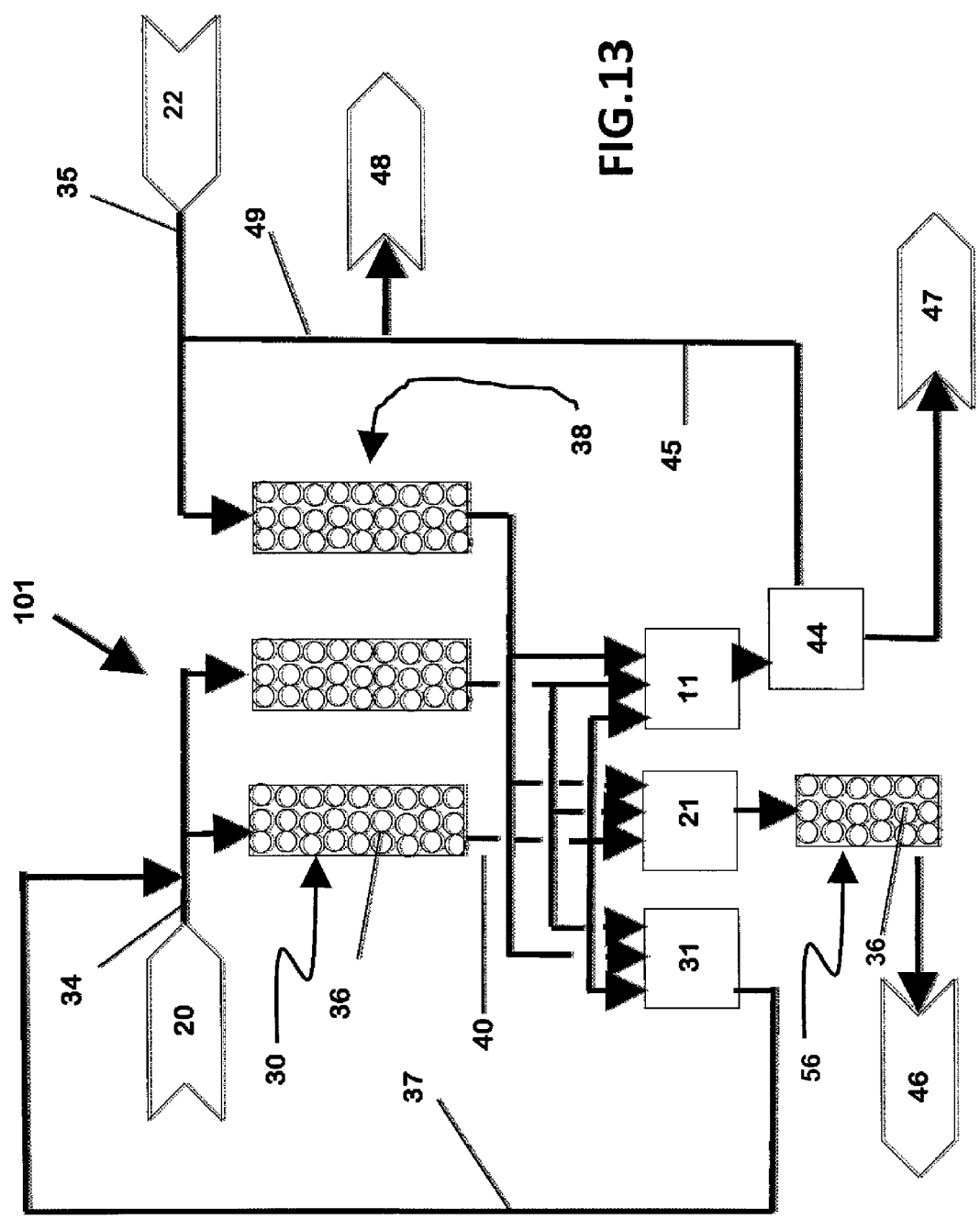
FIG. 13 is a flow diagram of a process to separate dissolve substances from aqueous solutions according to another embodiment of the invention illustrating operation where a portion of effluent with low relative concentrations of undesirable solute is further treated to reduce the concentration of undesirable solute with a separate "polishing" process containing either amphoteric media that can be regenerated with low salinity water or with other media that require chemical regeneration with acid and alkaline chemicals.

FIG. 13 is a schematic block diagram illustrating another embodiment of a system 101 that would be applied in circumstances to further treat fluid with low concentrations of undesirable constituents 21 via an additional vessel 56 of media capable of removing undesirable constituents to lower concentrations via a process called "polishing". The additional vessel 56 may contain either amphoteric media 36 with subsequent removal of undesirable constituents via rinse water to remove the adsorbed solutes from the media or alternative removal media such as weak acid cation resin or chelating resin that undergo chemical regeneration with acid such as hydrochloric acid followed by an alkaline chemical such as sodium hydroxide to remove the undesirable constituents from the media. The additional vessel 56 may be operated either in the "polishing mode" to treat fluid with low concentrations of undesirable constituents 21 or may be operated to treat the feed solution 20.

The operating conditions including and not limited to temperature, flow velocity, and relative directions of fluid flow within the vessel for the additional vessel 56 when operated in the "polishing mode" may vary significantly when compared to said operating conditions when treating the feed solution 20.

Figure 14:
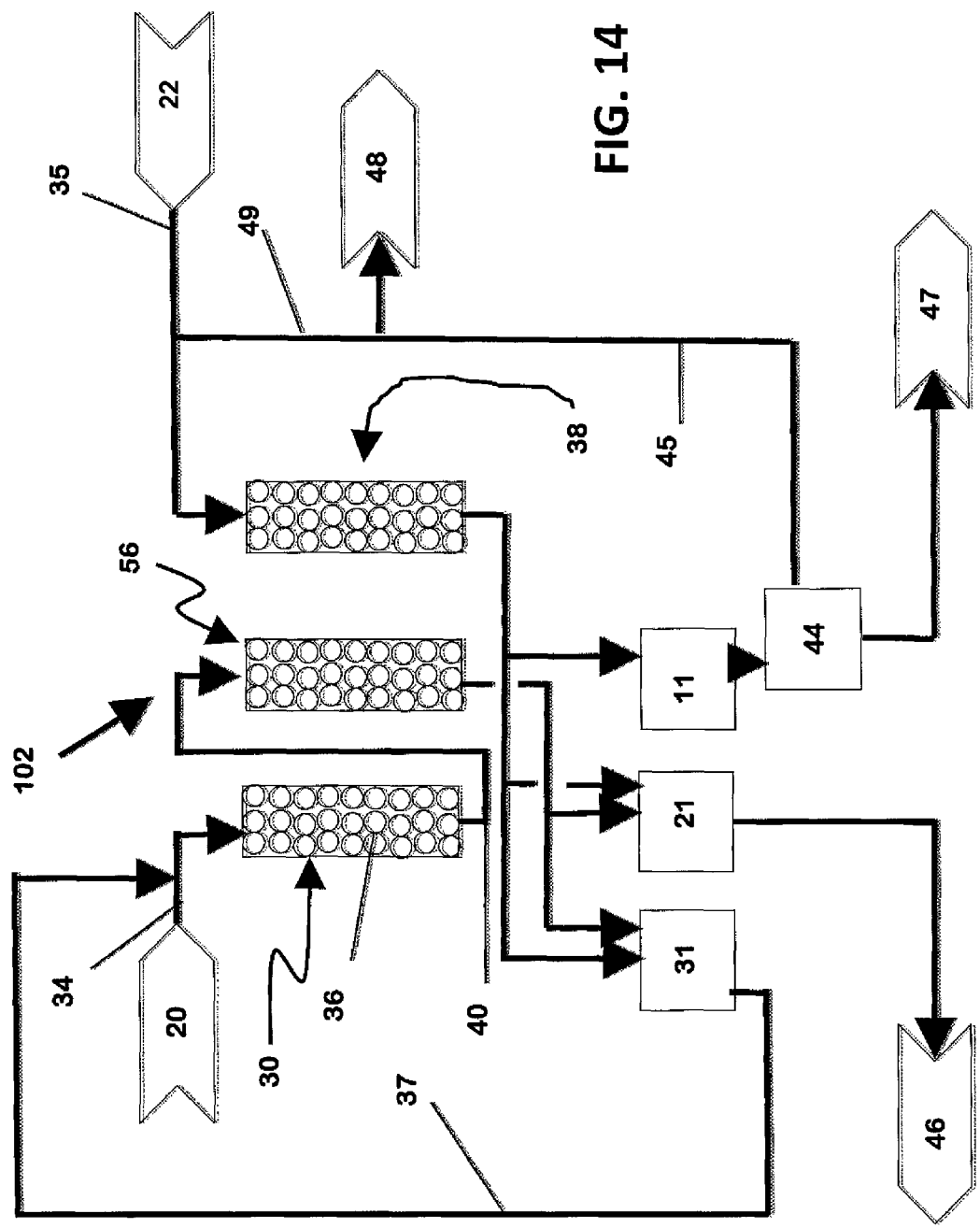
FIG. 14 is a flow diagram of a process to separate dissolved substances from aqueous solutions according to another embodiment of the invention illustrating operation with two or more columns receiving aqueous solution in series during one part of a treatment cycle while at the same time one or more other ion retardation columns are receiving rinse water at varying stages within the treatment cycle. The objective is to maximize removal of solutes that have the highest affinity for the media by fully utilizing available media capacity for the high affinity solutes in a primary or first media column and use the secondary or second media column to remove trace quantities of the high affinity solute from the effluent of the primary column. When the media capacity in the primary media column has essentially been fully utilized, the primary column is rinsed to remove the high affinity solutes that were adsorbed by the media, the secondary column becomes the primary column, and a fully rinsed column is moved into the secondary position.

FIG. 14 is a schematic block diagram illustrating another embodiment of a system 102 that would be applied in circumstances where it is desirable to maximize the removal of one or more undesirable solutes with higher affinity for amphoteric media relative to other undesirable solutes that may also be removed by the amphoteric media 36 prior to introduction of rinse water 35 to remove the adsorbed solutes from the media. One example would be in the application shale gas wastewater treatment for the separation of divalent cation salts from shale gas wastewater where it is desirable to preferentially remove low concentrations of divalent cations with higher affinity for the media such as but not limited to barium, radium, and iron with minimal removal of divalent cations with lesser affinity for the media such as calcium and magnesium. Under such circumstances, the feed water to be treated 20 would first flow through a primary media column 30 and the effluent from said column would subsequently flow through a secondary media column 56 to assure that the concentration of undesirable solute in the final effluent would be adequately low to meet the needs of the desired beneficial use 46. When a desired treated water volume or concentration in the effluent of the divalent cations to be removed by the primary media column 30 reaches a predetermined maximum which may exceed the concentration acceptable for beneficial use 46 or even reach the concentration in the feed water 20, the primary media column 30 is removed from treatment service for rinsing for removal of the preferentially removed divalent cations, the secondary media column 56 is moved into the primary media column position, and a fully rinsed column 38 is moved into the secondary media column position. Media columns regularly transition through online secondary treatment to online primary treatment to offline rinse positions with the frequency determined by the feed water chemical characteristics.

Although the present invention has been described with reference to preferred embodiments, workers skilled in the art will recognize that changes may be made in form and detail without departing from the spirit and scope of the invention.

What is claimed is:

1. A process for treatment of a feedwater stream containing solutes in a treatment system, said system comprising at least one vessel containing an amphoteric ion exchange media, said process comprising:
    (a) providing a feedwater stream containing ionic solutes therein, said solutes comprising
        (i) divalent cationic solutes with high affinity for adsorption by amphoteric media,
        (ii) monovalent cationic solutes with low affinity for adsorption by amphoteric media,
    (b) passing said feedwater stream through said vessel, effecting two or more of the following
        (i) adsorption of the solutes with high affinity for adsorption by the amphoteric media,
        (ii) adsorption followed by partial desorption and passage out of the vessel of the solutes with low affinity for the amphoteric media;
    (c) providing a water supply containing a lower concentration of ionic solutes than found in the feed stream to be used as a rinse stream;
    (d) passing said rinse stream through said vessel, following step (b) effecting the following in the following sequence
        (i) partial desorption and passage out of the vessel of solutes with low affinity for amphoteric media that had been adsorbed by the amphoteric media in step (b),
        (ii) partial desorption of solutes with high affinity for adsorption by amphoteric media that had been adsorbed by the amphoteric media in step (b);
    (e) collecting the liquid effluent exiting said vessel during step b) in the following portions
        (i) a portion containing primarily the solute or solutes with relatively low affinity for adsorption by amphoteric media,
        (ii) a portion containing primarily the solute or solutes with relatively high affinity for adsorption by amphoteric media,
        (iii) a portion containing both the solute or solutes with relatively high affinity for adsorption by amphoteric media and the solute or solutes with relatively low affinity for adsorption by amphoteric media;
    (f) separating the solutes of the portion of step (e)(ii) via a first desalination system that serves both to concentrate the solutes into a smaller volume and to provide said water supply containing a lower concentration of the solutes than found in the feed stream to be used as a rinse stream in step (c);
    (g) diverting the portion exiting said vessel in step (e)(i) to product containment;
    (h) diverting the portion concentrated via desalination in step (f) to waste containment;
    (i) diverting the portion exiting said vessel in step (e)(iii) for recycle to the feed stream in step (a).

2. The process as set forth in claim 1, further comprising the step of providing two or more of said vessels containing amphoteric media connected in series or parallel.

3. The process according to claim 2 wherein in step (c) said rinse stream passes simultaneously in parallel through said vessels.

4. The process according to claim 2 wherein in step (b) said feed stream passes simultaneously in parallel through said vessels.

5. The process as set forth in claim 1 wherein wherein step (f) further comprises the step of providing desalination equipment consisting of at least one of a membrane separator, and a thermal separator.

6. The process according to claim 5 wherein said membrane separator is a reverse osmosis membrane separator.

7. The process according to claim 5 wherein said thermal separator is a thermal evaporation separator.

8. The process as set forth in claim 5 further comprising the step of precipitating solutes from the portion of step (e)(ii) prior to concentration in the desalinization equipment.

9. The process as set forth in claim 5, further comprising contacting the portion of step (e)(ii) with a strong base anion exchange resin prior to concentration with the desalinization equipment.

10. The process according to claim 1 wherein a direction of flow for the step of (b) passing said feed stream through said vessel is in a same direction as a direction of flow for the step of (d) passing said rinse stream through said vessel.

11. The process according to claim 1 wherein a direction of flow for the step of (b) passing said feed stream through said vessel is in an opposite direction as a direction of flow for the step of (d) passing said rinse stream through said a vessel.

12. The process as set forth in claim 1, wherein said feedwater stream is passed to an additional desalination system to separate the feed stream into first stream in which the solutes are concentrated into a smaller volume and a second stream containing a lower concentration of solutes than found in the feed stream, wherein said first stream is passed to said vessel in step (b) and said second stream is passed to said product containment.

13. The process according to claim 12 wherein said additional desalination system comprises a reverse osmosis membrane separator.

14. The process according to claim 12 wherein said additional desalination equipment comprises a thermal evaporation separator.

15. The process as set forth in claim 1, further comprising the step of passing the portion exiting said vessel in step (e)(i) through a vessel containing one of an amphoteric ion exchange media, a weak acid cation exchange resin, and a chelating exchange resin.

* * * * *

UNITED STATES PATENT AND TRADEMARK OFFICE
CERTIFICATE OF CORRECTION

| | | |
|---|---|---|
| PATENT NO. | : 8,999,172 B1 | Page 1 of 1 |
| APPLICATION NO. | : 13/324595 | |
| DATED | : April 7, 2015 | |
| INVENTOR(S) | : Joseph E. Zuback | |

It is certified that error appears in the above-identified patent and that said Letters Patent is hereby corrected as shown below:

In the claims,

Column 26, Claim 5, line 14, delete "wherein wherein step" and insert --wherein step--

Column 26, Claim 11, line 36, delete "a" after "through said"

Signed and Sealed this
First Day of December, 2015

Michelle K. Lee
*Director of the United States Patent and Trademark Office*